United States Patent
Bateman et al.

(10) Patent No.: US 8,557,343 B2
(45) Date of Patent: Oct. 15, 2013

(54) ACTIVATION METHOD

(75) Inventors: Stuart Arthur Bateman, Mount Waverley (AU); Francisco Cardonna, Toowoomba (AU); Ranya Simons, Richmond (AU); Dong Yang Wu, Wheelers Hill (AU); Douglas H. Berry, Seattle, WA (US); James F. Kirchner, Renton, WA (US); Seana B. Kobak, Sammamish, WA (US); Jill E. Seebergh, Seattle, WA (US)

(73) Assignees: The Boeing Company, Seattle, WA (US); Commonwealth Scientific and Industrial Research Organisation, Campbell (AU)

( * ) Notice: Subject to any disclaimer, the term of this patent is extended or adjusted under 35 U.S.C. 154(b) by 1049 days.

(21) Appl. No.: 10/593,364

(22) PCT Filed: Mar. 17, 2005

(86) PCT No.: PCT/US2005/009091
§ 371 (c)(1),
(2), (4) Date: Mar. 28, 2007

(87) PCT Pub. No.: WO2005/089480
PCT Pub. Date: Sep. 29, 2005

(65) Prior Publication Data
US 2007/0218295 A1   Sep. 20, 2007

(30) Foreign Application Priority Data
Mar. 19, 2004 (AU) ................................ 2004901481

(51) Int. Cl.
*B05D 3/10* (2006.01)

(52) U.S. Cl.
USPC .......................................... 427/336; 427/407.1

(58) Field of Classification Search
USPC ............. 427/336, 407.1; 428/411.1, 426, 457
See application file for complete search history.

(56) References Cited

U.S. PATENT DOCUMENTS

| | | | |
|---|---|---|---|
| 3,286,009 A | | 11/1966 | Yumoto et al. |
| 3,499,853 A | * | 3/1970 | Drawert et al. ............. 528/339.3 |
| 3,570,748 A | * | 3/1971 | Coyle et al. .................... 383/116 |
| 3,607,473 A | | 9/1971 | Homrok et al. |
| 3,751,280 A | | 8/1973 | Neruker et al. |
| 3,751,287 A | | 8/1973 | Baier et al. |
| 3,839,078 A | * | 10/1974 | Birchall et al. ............... 427/377 |

(Continued)

FOREIGN PATENT DOCUMENTS

CN   1184717 A   6/1998
EP   153973 A    11/1985

(Continued)

OTHER PUBLICATIONS

Office action dated Jan. 8, 2013 from related Japanese Patent Application No. 2007-551517 with English translation (5 pages).

(Continued)

*Primary Examiner* — Michael Cleveland
*Assistant Examiner* — Alexander Weddle
(74) *Attorney, Agent, or Firm* — Ladas & Parry, LLP

(57) ABSTRACT

A method of activating an organic coating, a coated substrate having an activated coating and an activation treatment for an organic coating. In particular, the activation method improves the adhesion of the organic coating to further coating layers and/or to other entities.

35 Claims, 38 Drawing Sheets

(56) References Cited

U.S. PATENT DOCUMENTS

| | | | |
|---|---|---|---|
| 3,994,751 A | 11/1976 | Ingram | |
| 4,223,115 A | 9/1980 | Zalucha et al. | |
| 4,233,354 A * | 11/1980 | Hasegawa et al. | 428/195.1 |
| 4,234,628 A | 11/1980 | DuRose | |
| 4,281,037 A | 7/1981 | Choung | |
| 4,293,665 A | 10/1981 | Zalucha et al. | |
| 4,525,511 A | 6/1985 | Kirby et al. | |
| 4,609,746 A | 9/1986 | Barfurth et al. | |
| 4,643,789 A | 2/1987 | Parker et al. | |
| 4,647,680 A | 3/1987 | Barfurth et al. | |
| 4,741,931 A | 5/1988 | Lin et al. | |
| 4,743,503 A | 5/1988 | Lin et al. | |
| 4,818,325 A | 4/1989 | Hiraiwa et al. | |
| 4,839,454 A | 6/1989 | Lin et al. | |
| 4,855,001 A | 8/1989 | Damico et al. | |
| 4,874,462 A | 10/1989 | Makita et al. | |
| 4,885,218 A | 12/1989 | Andou et al. | |
| 4,902,578 A | 2/1990 | Kerr et al. | |
| 5,116,637 A | 5/1992 | Baney et al. | |
| 5,124,180 A | 6/1992 | Proscia | |
| 5,212,017 A | 5/1993 | Meder | |
| 5,240,989 A * | 8/1993 | Bernard et al. | 524/560 |
| 5,248,334 A * | 9/1993 | Fey | 106/287.11 |
| 5,292,364 A | 3/1994 | Hiraiwa et al. | |
| 5,368,894 A | 11/1994 | Lammers et al. | |
| 5,393,907 A | 2/1995 | Hashimoto et al. | |
| 5,512,527 A | 4/1996 | Ritter | |
| 5,623,010 A | 4/1997 | Groves | |
| 5,743,951 A | 4/1998 | Ozai et al. | |
| 5,858,462 A | 1/1999 | Yamazaki | |
| 5,878,153 A | 3/1999 | Mikulec et al. | |
| 5,879,757 A | 3/1999 | Gutowski et al. | |
| 5,889,115 A | 3/1999 | Yabuta et al. | |
| 5,922,161 A | 7/1999 | Wu et al. | |
| 5,958,509 A | 9/1999 | Neumann | |
| 6,042,877 A | 3/2000 | Lyon et al. | |
| 6,066,406 A | 5/2000 | McComas | |
| 6,099,939 A | 8/2000 | Mittal et al. | |
| 6,175,009 B1 * | 1/2001 | Confalone et al. | 544/285 |
| 6,436,530 B1 | 8/2002 | Szonn et al. | |
| 6,436,615 B1 | 8/2002 | Brandow et al. | |
| 6,495,309 B1 | 12/2002 | Brabbs et al. | |
| 6,511,752 B1 | 1/2003 | Yao et al. | |
| 6,524,658 B2 | 2/2003 | Murofushi et al. | |
| 6,562,428 B1 | 5/2003 | Ohrui | |
| 6,592,973 B1 | 7/2003 | Nakata et al. | |
| 6,737,145 B1 | 5/2004 | Watanabe et al. | |
| 6,743,267 B2 | 6/2004 | Jernakoff et al. | |
| 6,759,178 B2 | 7/2004 | Brabbs et al. | |
| 6,783,692 B2 | 8/2004 | Bhagwagar | |
| 6,897,151 B2 | 5/2005 | Winter et al. | |
| 6,990,904 B2 | 1/2006 | Ibarra et al. | |
| 7,014,669 B2 | 3/2006 | Small et al. | |
| 7,029,508 B2 | 4/2006 | Scott et al. | |
| 7,077,880 B2 | 7/2006 | Siddiqui | |
| 7,097,882 B2 | 8/2006 | Seo et al. | |
| 7,156,945 B2 | 1/2007 | Chaug et al. | |
| 7,211,320 B1 | 5/2007 | Cooper et | |
| 7,261,920 B2 | 8/2007 | Haubrich et al. | |
| 7,273,821 B2 | 9/2007 | Sezi | |
| 7,311,978 B2 | 12/2007 | Fukasawa et al. | |
| 7,399,376 B2 | 7/2008 | Wang et al. | |
| 7,419,601 B2 | 9/2008 | Cooper et al. | |
| 7,419,615 B2 | 9/2008 | Strauss | |
| 7,427,305 B2 | 9/2008 | Scott et al. | |
| 7,429,338 B2 | 9/2008 | Siddiqui | |
| 7,442,412 B2 | 10/2008 | Miller | |
| 7,445,815 B2 | 11/2008 | Kagan et al. | |
| 7,513,920 B2 | 4/2009 | Siddiqui et al. | |
| 7,588,801 B2 | 9/2009 | Endo et al. | |
| 7,625,840 B2 | 12/2009 | Pellin et al. | |
| 7,632,535 B2 | 12/2009 | Carlson et al. | |
| 7,670,797 B2 | 3/2010 | Vacanti et al. | |
| 7,740,940 B2 | 6/2010 | Hanson | |
| 2002/0064602 A1 | 5/2002 | Murofushi et al. | |
| 2002/0098347 A1 | 7/2002 | Szonn et al. | |
| 2002/0132061 A1 | 9/2002 | Sezi | |
| 2003/0013042 A1 | 1/2003 | Brabbs et al. | |
| 2003/0072951 A1 | 4/2003 | Seo et al. | |
| 2003/0114083 A1 | 6/2003 | Jernakoff et al. | |
| 2003/0162398 A1 | 8/2003 | Small et al. | |
| 2003/0194504 A1 * | 10/2003 | Bilyk et al. | 427/458 |
| 2004/0006924 A1 | 1/2004 | Scott et al. | |
| 2004/0023052 A1 | 2/2004 | Ambroise | |
| 2004/0025444 A1 | 2/2004 | Small et al. | |
| 2004/0029495 A1 | 2/2004 | Small et al. | |
| 2004/0075076 A1 | 4/2004 | Bhagwagar | |
| 2004/0077766 A1 | 4/2004 | De Cooman et al. | |
| 2004/0091625 A1 | 5/2004 | Winter et al. | |
| 2004/0112237 A1 | 6/2004 | Chaug et al. | |
| 2004/0131779 A1 | 7/2004 | Haubrich et al. | |
| 2004/0224095 A1 | 11/2004 | Miller | |
| 2005/0065028 A1 | 3/2005 | Pellin et al. | |
| 2005/0065060 A1 | 3/2005 | Kin et al. | |
| 2005/0079201 A1 | 4/2005 | Rathenow et al. | |
| 2005/0155296 A1 | 7/2005 | Siddiqui | |
| 2005/0249932 A1 | 11/2005 | Wang et al. | |
| 2005/0263456 A1 | 12/2005 | Cooper et al. | |
| 2006/0019326 A1 | 1/2006 | Vacanti et al. | |
| 2006/0089292 A1 | 4/2006 | Wirz et al. | |
| 2006/0117667 A1 | 6/2006 | Siddiqui et al. | |
| 2006/0127681 A1 | 6/2006 | Domes et al. | |
| 2006/0166013 A1 | 7/2006 | Endo et al. | |
| 2006/0180788 A1 | 8/2006 | Scott et al. | |
| 2006/0188657 A1 | 8/2006 | Kimura et al. | |
| 2006/0251908 A1 | 11/2006 | Fukasawa et al. | |
| 2006/0255015 A1 | 11/2006 | Siddiqui | |
| 2007/0003705 A1 | 1/2007 | Strauss | |
| 2007/0037904 A1 | 2/2007 | Jeong et al. | |
| 2007/0084797 A1 | 4/2007 | Cooper et al. | |
| 2007/0093600 A1 | 4/2007 | De Cooman et al. | |
| 2007/0104956 A1 | 5/2007 | Grandhee | |
| 2007/0134428 A1 | 6/2007 | Carlson et al. | |
| 2007/0148441 A1 | 6/2007 | Kagan et al. | |
| 2007/0166226 A1 | 7/2007 | Holmes et al. | |
| 2007/0184576 A1 | 8/2007 | Chang et al. | |
| 2007/0231496 A1 | 10/2007 | Eriksson et al. | |
| 2007/0256600 A1 | 11/2007 | Hedouin et al. | |
| 2008/0024527 A1 | 1/2008 | Phillips et al. | |
| 2008/0041791 A1 | 2/2008 | Cooper et al. | |
| 2008/0050598 A1 | 2/2008 | Bateman et al. | |
| 2008/0102212 A1 | 5/2008 | Endo et al. | |
| 2008/0111027 A1 | 5/2008 | Blohowiak et al. | |
| 2008/0152930 A1 | 6/2008 | Hanson | |
| 2008/0160328 A1 | 7/2008 | Jaworowski et al. | |
| 2008/0193746 A1 | 8/2008 | Beaurain et al. | |
| 2008/0245271 A1 | 10/2008 | Trabesinger et al. | |
| 2008/0254315 A1 | 10/2008 | Sato et al. | |
| 2008/0260950 A1 | 10/2008 | Schottner | |
| 2008/0283425 A1 | 11/2008 | Trabesinger et al. | |
| 2009/0017082 A1 | 1/2009 | Morimitsu et al. | |
| 2009/0017312 A1 | 1/2009 | Allam et al. | |
| 2009/0029553 A1 | 1/2009 | Scott et al. | |
| 2009/0061239 A1 | 3/2009 | Burckhardt et al. | |
| 2009/0104474 A1 | 4/2009 | Schwartz et al. | |
| 2009/0123741 A1 | 5/2009 | Bhatt et al. | |
| 2009/0148603 A1 | 6/2009 | Goscha | |
| 2009/0148711 A1 | 6/2009 | Le Blanc et al. | |
| 2009/0155607 A1 | 6/2009 | Huck et al. | |
| 2009/0165913 A1 | 7/2009 | Hergenrother et al. | |
| 2009/0181248 A1 | 7/2009 | van Ooij et al. | |
| 2009/0186232 A1 | 7/2009 | Okubo et al. | |
| 2009/0246539 A1 | 10/2009 | Huck | |
| 2009/0250656 A1 | 10/2009 | Siddiqui et al. | |
| 2009/0297829 A1 | 12/2009 | Pyles et al. | |
| 2009/0297830 A1 | 12/2009 | Pyles et al. | |
| 2009/0305051 A1 | 12/2009 | Corsaro | |
| 2009/0324836 A1 | 12/2009 | Tsurugi et al. | |
| 2009/0326146 A1 | 12/2009 | Sepeur et al. | |
| 2010/0009173 A1 | 1/2010 | Lee et al. | |
| 2010/0027192 A1 | 2/2010 | Perry et al. | |
| 2010/0028692 A1 | 2/2010 | Hedouin et al. | |
| 2010/0044219 A1 | 2/2010 | Carlson et al. | |
| 2010/0055795 A1 | 3/2010 | Lee | |

(56) References Cited

U.S. PATENT DOCUMENTS

| | | | |
|---|---|---|---|
| 2010/0068392 A1 | 3/2010 | Bauerochse et al. |
| 2010/0068542 A1 | 3/2010 | Bright et al. |
| 2010/0078123 A1 | 4/2010 | Huang et al. |
| 2010/0098877 A1 | 4/2010 | Cooper et al. |
| 2010/0143731 A1 | 6/2010 | DeZurik et al. |
| 2010/0196718 A1 | 8/2010 | Oltean et al. |
| 2011/0008765 A1 | 1/2011 | Vacanti et al. |

FOREIGN PATENT DOCUMENTS

| | | |
|---|---|---|
| EP | 0241851 | 10/1987 |
| EP | 0247539 A1 | 12/1987 |
| EP | 0268330 A2 | 5/1988 |
| EP | 347049 A | 12/1988 |
| EP | 0268330 B1 | 5/1992 |
| EP | 0761738 A1 | 3/1997 |
| EP | 1042419 B1 | 8/2004 |
| EP | 1042419 B2 | 8/2007 |
| EP | 1894979 | 3/2008 |
| FR | 2692276 | 12/1993 |
| GB | 1401296 | 7/1975 |
| GB | 2110705 A | 6/1983 |
| JP | 59-152961 A | 8/1984 |
| JP | 59152961 A | 8/1984 |
| JP | 62-250975 | 10/1987 |
| JP | 2169681 A | 6/1990 |
| JP | 3006275 A | 1/1991 |
| JP | 3031370 A | 2/1991 |
| JP | 04351643 A2 | 12/1992 |
| JP | 5247412 A | 9/1993 |
| JP | 6091783 A | 4/1994 |
| JP | 09087588 A | 3/1997 |
| JP | 10-183051 | 7/1998 |
| JP | 10183051 A | 7/1998 |
| JP | 2002235179 | 8/2002 |
| JP | 2003-512490 | 4/2003 |
| JP | 2004155983 | 6/2004 |
| JP | 29034589 A | 2/2009 |
| WO | WO 91/08238 | 6/1991 |
| WO | WO 93/22070 | 11/1993 |
| WO | 95/20006 A1 | 7/1995 |
| WO | WO 97/00913 | 1/1997 |
| WO | WO 97/02310 | 1/1997 |
| WO | WO 97/06896 | 2/1997 |
| WO | WO 99/32303 | 7/1999 |
| WO | WO 99/58741 | 11/1999 |
| WO | WO 00/06210 | 2/2000 |
| WO | WO 00/23523 | 4/2000 |
| WO | WO 01/01199 | 1/2001 |
| WO | 01/29118 A1 | 4/2001 |
| WO | WO 01/029118 | 4/2001 |
| WO | WO 02/070620 | 9/2002 |
| WO | WO 03002500 | 1/2003 |
| WO | WO 03/068882 | 8/2003 |
| WO | 03/097756 A1 | 11/2003 |
| WO | 2003/093386 A1 | 11/2003 |
| WO | WO 2004/011253 | 2/2004 |
| WO | WO 2004/038732 | 5/2004 |
| WO | WO 2004/065616 | 8/2004 |
| WO | WO 2004/076568 | 9/2004 |
| WO | WO 2004/076717 | 9/2004 |
| WO | WO 2004/076718 | 9/2004 |
| WO | WO 2004/080578 | 9/2004 |
| WO | WO 2004/091810 | 10/2004 |
| WO | WO 2004/101852 | 11/2004 |
| WO | WO 2004/105826 | 12/2004 |
| WO | WO 2005/023949 | 3/2005 |
| WO | WO 2005/028176 | 3/2005 |
| WO | WO 2005/054391 | 6/2005 |
| WO | 2005/089480 A | 9/2005 |
| WO | WO 2005/093002 | 10/2005 |
| WO | WO 2005/100452 | 10/2005 |
| WO | WO 2005/111665 A2 | 11/2005 |
| WO | WO 2006/086828 | 8/2006 |
| WO | WO 2006/092536 | 9/2006 |
| WO | WO 2006/124670 | 11/2006 |
| WO | WO 2007/003828 | 1/2007 |
| WO | WO 2007/056002 | 5/2007 |
| WO | WO 2007/058724 | 5/2007 |
| WO | WO 2007/077136 | 7/2007 |
| WO | WO 2007/094253 | 8/2007 |
| WO | WO 2007/099157 | 9/2007 |
| WO | WO 2007/113141 | 10/2007 |
| WO | WO 2007/122056 | 11/2007 |
| WO | WO 2007/123071 | 11/2007 |
| WO | WO 2007/142279 | 12/2007 |
| WO | WO 2008/010230 | 1/2008 |
| WO | WO 2008/034409 | 3/2008 |
| WO | WO 2008/048201 | 4/2008 |
| WO | WO 2008/060582 | 5/2008 |
| WO | WO 2008/025845 | 6/2008 |
| WO | WO 2008/082493 | 7/2008 |
| WO | WO 2008/083304 | 7/2008 |
| WO | WO 2009/009159 | 1/2009 |
| WO | WO 2009/052352 | 4/2009 |
| WO | WO 2010/007882 | 1/2010 |
| WO | WO 2010/039636 | 4/2010 |
| WO | WO 2010/078251 | 7/2010 |

OTHER PUBLICATIONS

Examination Report for related Japanese Application No. 2007-551517 issued on Oct. 4, 2011 with English-language translation.
Extended European Search Report for European Patent Appl. No. EP 06 74 1074 dated Jan. 28, 2008.
Derwent Abstract Accession No. 97-255794, (A18 A26), JP 0987588 A (Kanebuchi Kagaku Kogyo KK) Mar. 31, 1997.
STN File Caplus, Abstract 1993 :235997, & JP 04351643 A2 (Nippon Petrochemicals Co Ltd) Dec. 7, 1992.
ISR and WO for related International Appl. PCT/AU2006/000070 dated Feb. 27, 2006.
IPRP (Chapter II) for related International Appl. PCT/AU2006/000070 dated Dec. 11, 2006.
Office Action dated Apr. 19, 2010 for related U.S. Appl. No. 11/784,534.
Office Action dated Aug. 19, 2010 for related U.S. Appl. No. 11/784,534.
Office Action dated Apr. 13, 2011 for related U.S. Appl. No. 11/784,534.
Office Action dated Aug. 6, 2012 for related U.S. Appl. No. 11/784,534.
FluoroEtch—Material Safety Data Sheet Prepared Jan. 25, 2001, published 2002.
Rompp Lexikon Chemie "Rompp Lexikon Chemie-10." Georg Thieme Verlag, 1998.
Sathyanarayana, M.N. et al "Role of promoters in improving adhesion of organic coatings to a substrate" Progress in Organic Coatings . vol. 26. pp. 275-313. Sep.-Dec. 1995.
EPA et al "Organic Coating Replacements" Guide to Cleaner Technologies Sep. 1994.
Gu, Xiaohong et al "Advanced Techniques for Nanocharacterization of Polymeric Coating Surfaces" JCT Research, vol. 1, No. 3, Jul. 1, 2004.
Ge J. et al "Effects of surface treatment on the adhesion of copper to a hybrid polymer material" Journal of Materials Research vol. 18 No. 11, Nov. 2003.
Gu, X. et al "Advanced Techniques for Nanocharacterization of Polymeric Coating Surfaces", National Institute of Standards and Technology, Nov. 2003.
Rahimi Azam, "Inorganic and Organometallic Polymers: A Review" Iranian Polymer Journal, vol. 13., No. 2., Nov. 2004.
English translation of Office Action for Chinese Patent Application No. 200680001495.3 corresponding to U.S. Appl. No. 11/784,534, dated Jan. 30, 2011.
EPO Notice of Opposition for EPO Application No. 06741074.6 corresponding to U.S. Appl. No. 11/784,534, dated Mar. 10, 2010 including English language translation (Google Translate).

* cited by examiner

Topside Only of Foil is Rated (5 to )

5: 0 to 1/16" Tear 4.5: 1/16 to 1/8" Tear

4: 1/8 to 1/4" Tear 3.5: _ to 1/2" Tear

3: _ to 3/4" Tear

2: 15 to 33% Removed 1.5: 33 to 50% Removed

1: 50 to 70% Removed 0.5: 70 to 90% Removed

All views and ratings are of the top and outboard surface.

Untreated     Dichloromethane     Dichloroethylene

Untreated     Benzyl alcohol     Ethylene glycol monomethyl ether

Untreated     ethyl acetate     t-butyl acetate     i-propyl acetate

Untreated methyl amyl ketone

Untreated ethylene glycol
dimethyl ether tetrahydrofuran

Untreated

N-methyl pyrrolidinone

Untreated

N-methyl Pyrrolidinone : Ethyl acetate (1:1) 4,7,10-trioxa-1,13-tridecanediamine Untreated Dichloromethane : Benzyl alcohol
(1:1) amino terminated
polypropylene glycol Untreated Ethyl acetate : Benzyl alcohol (1:1)
4,7,10-trioxa-1,13-tridecanediamine Untreated              Ethyl acetate : diglycol ether dimethyl
                       ether (1: 1) 4,7,10-trioxa-1,13-
                       tridecanediamine Untreated     Mn = 254      Mn=4000

Untreated        Mn = 740

Untreated     Mn = 750

Untreated     Linear     Branched     Branched
(Mw 425)    (Mw=800)    (Mw=25000)

Untreated    4,7,10-trioxa-    4,9-dioxadodecane    4,7-dioxadecane-
           1,13-             -1,12-diamine        1,10-diamine
           tridecanediamine Untreated    ethylene diamine    triethylene      pentaethylene
                                 tetraamine       hexamine Untreated         Propyl amine         PEI linear Untreated                PEI (branched MW 25K), 10% &
                         PEI linear 0.43K 50%

Untreated         4,7,10-trioxa-1,13-tridecanediamine
                  (40%), diethylene triamine (10%) in benzyl
                  alcohol Untreated    50%    10%    1%    0.1%

Untreated    50%    10%    1%    0.1%

Untreated    0° (horizontal)    45°    90° (Vertical)

Untreated    No additive    1% Methocell    1% Crayvallac

Untreated    5 min    24h

Untreated    HVLP Spray Gun    Mechanical Spray Bottle    Pipette

Untreated / isopropyl alcohol / isopropyl alcohol / no wipe or
                wash              wipe                wash Untreated          50%              1%
        4,7,10-trioxa-1,13-tridecanediamine Untreated            50%            1%
4,7,10-trioxa-1,13-tridecanediamine Untreated            50%            1%
4,7,10-trioxa-1,13-tridecanediamine Untreated Treatment : Amino-terminated polypropyleneglycol 50% in dichloromethane (30 min)

Untreated    4,7,10-trioxa-1,    Polyethylene-    Triethylene
            13-tridecanediamine    imine (1)       tetraamine Original Adhesion    Adhesion after 3 month ambient
                     storage prior to over-coating Original Adhesion    Adhesion after 3 month ambient
                     storage prior to over-coating Adhesion 2 days    Adhesion after
                   5 month ambient storage Adhesion 2 Days    Adhesion after
                   5 months ambient storage Untreated          Polyethylene imine      4,7,10-trioxa-1,13-
                        (linear)            tridecanediamine Untreated          Polyethylene imine      4,7,10-trioxa-1,13-
                        (linear)            tridecanediamine Untreated    4,7,10-trioxa-1,13-    4,7-dioxadecane    triethylene
            tridecanediamine      -1, 10-diamine     tetraamine Untreated    Sanded    4,7,10-trioxa-1,13-    polyethylene
                    tridecanediamine    imine(linear)

FIG. 47
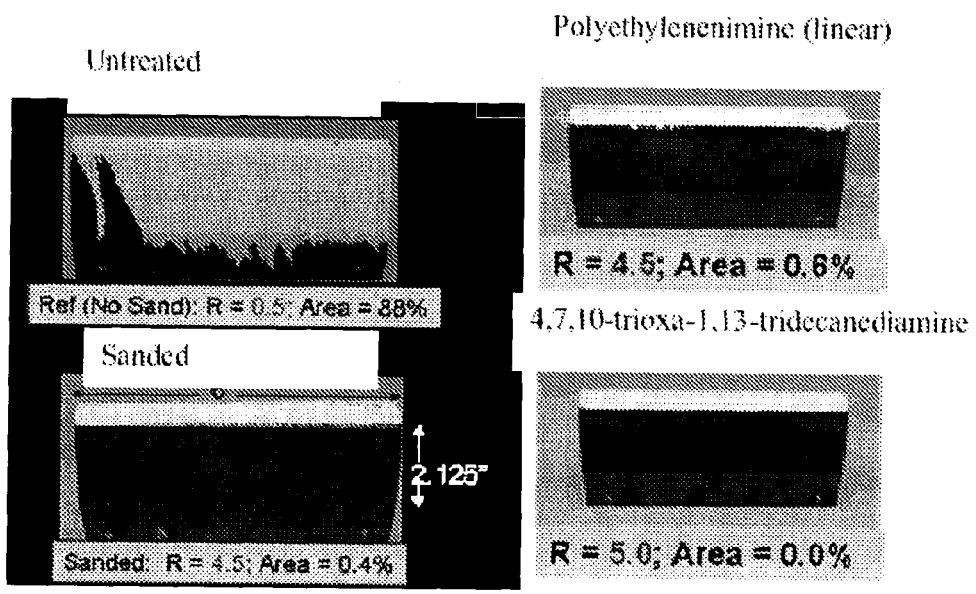
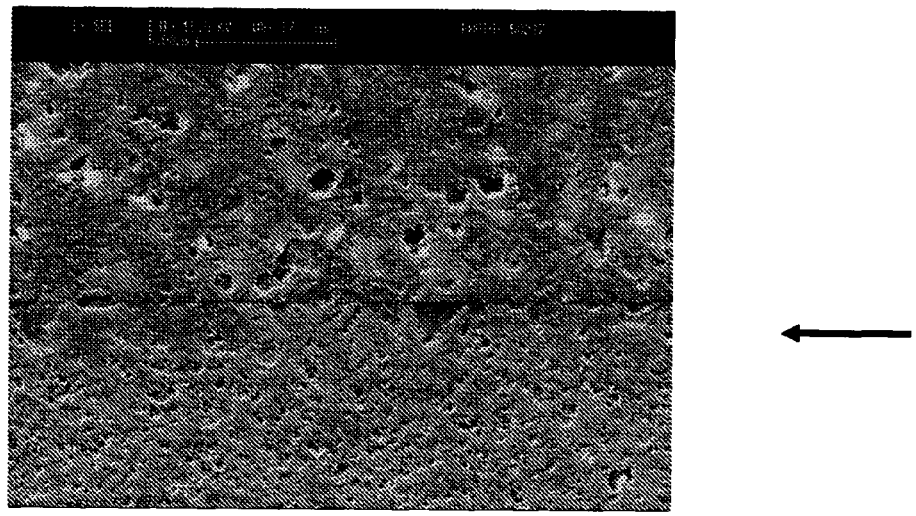
FIG. 48A.

IPA : EEA, 7:3

Sanded    Untreated    2.0% Trimethanolpropane
-triglycidyl ether
2.5% Trimethoxysilyl(propyl)
diethylene triamine
0.1% Methylimidazole IPA: ethoxy ethyl acetate    MEK: ethoxyethyl acetate
7:3                      7:3

Sanded    Untreated    2.0% Trimethanolpropane triglycidyl ether
2.5% Trimethoxysilyl(propyl)diethylene triamine
0.1% Methylimidazole Sanded    Untreated    IPA:EEA 7:3

Adhesion Promoter System
2.0% Trimethanolpropane-triglycidyl ether
2.5% Trimethoxy silane(propyl)diethylene triamine
0.1% Methylimidazole TODA / Ethyl acetate Numbers 1-3:
5, 10, 25% TODA/Ethyl acetate 1: Water
2: MPK
16: Aminosilane – epoxy adhesion promoter system in IPA:EEA, 7:3)

Paint Thickness : Primer, IC + White (C2) 30±5 micron, Desothane HS S601X Blue (100±10 micron)

Cycle: 1.  2.  3.  4.

Activation History :

ACTIVATION METHOD

FIELD

The present writing relates to a method of activating an organic coating, a coated substrate having an activated coating and an activation treatment for an organic coating. In particular, the activation method improves the adhesion of the organic coating to further coating layers and/or to other entities.

BACKGROUND

Organic coatings are generally used to protect the surface of materials from incidental damage, abrasion, chemical attack and from environmental or in-service degradation. Organic coatings are also used to enhance the aesthetics and/or optical properties of an object or component.

The surface properties of many coatings dramatically change on drying, curing and/or aging to become more inert than might be predicted based on the chemistry of their individual components alone. Whilst this phenomenon in part provides the coating with chemical resistance, impact strength and abrasion resistance, it also complicates the process of applying additional coating layers, particularly when they are not applied within a predetermined reapplication window. The same problem arises with applying other entities such as sealants, fillers, stickers and the like, to such coatings. In cases which require the application of additional coating layers and/or other entities, a mechanical or stripping process of the coating is generally necessary before the re-application procedure can take place.

In the specific example of aircraft coatings, it is well known that adhesion will not meet in-service performance requirements when fresh layers of coating are applied over layers which have aged beyond the acceptable reapplication window. The acceptable window may be of the order of days under ambient conditions or hours under conditions of high temperature and/or humidity. Once the reapplication window has been exceeded, the standard practice for applying additional coating layers on aircraft involves mechanical abrasion of the aged coating.

Both chemical stripping and mechanical abrasion have limitations. Mechanical abrasion is labor intensive, the reproducibility is variable, and it is ergonomically costly due to the highly repetitive and vibratory nature of the work. As such there is a pressing need for the development of a surface treatment to improve the adhesion of aged or inert industrial organic coatings towards additional coating layers or other entities, for example, adhesives, sealants, fillers, stickers and the like.

Haack (*Surface and Interface Anal*, (2000), 29, p 829) investigated the interaction of automotive polyurethane coatings using UV light to generate ozone. Promising results in terms of improved adhesion and reduced water contact angles were produced when paint formulations incorporating $TiO_2$ were subjected to $H_2O_2$ and UV light. However, there are obvious practical difficulties associated with this strategy, particularly in terms of its commercial viability for application in areas susceptible to corrosion and for treating larger surfaces. Also the occupational health and safety issues make it less suited to commercial application.

Coating manufacturers have developed a method of improving the procedure of coating stripping through the development of barrier layers which, for example, protect the primer and conversion coating of metal structures from the chemical stripping agents (U.S. Pat. No. 6,217,945). Although this procedure would inevitably improve the rate of paint stripping and reduce the amount of infrastructure down time it still relies on paint removal to provide a surface which will accept a fresh coating layer with acceptable adhesion.

In the biological field, Park et al. (*Biomaterials*, (1998), 19, p 851) employed the surface urethane NH group to graft chemical species onto polyurethane rubber, whilst Levy et al. (*Biomaterials* (2001) 22, p 2683) employed a strong base to remove the surface urethane NH proton to accelerate such nucleophilic grafting reactions. Both strategies are unsuitable for activating organic coatings. The chemical reaction kinetics of the first strategy would be too slow to be practical, particularly since, considering the low surface energy and inertness to bonding of such coatings, the urethane NH groups may not be oriented towards the air-coating interface. The use of very strong bases, as per the second strategy, may degrade existing paint layers, resulting in a mechanically weak foundation for fresh coatings to adhere to. Furthermore, the latter strategy is also unacceptable for activating large areas due to corrosion and health and safety considerations.

Other strategies in the biological field have employed free radical techniques to graft molecules onto the surface of biomedical polyurethane surfaces (Matuda et al, *J. Biomed. Res*., (2002), 59, p 386; Eaton et al, *Biomaterials*, (1996), 17, p 1977). Although commercially viable, the main difficulty with this strategy lies in promoting actual grafting of the substrate.

Controlled glycolysis or aminolysis as described in *Polymer Engineering & Science* (1978), 18, p 844, and *J. Applied Polymer Science* (1994), 51, p 675) has very slow kinetics at room temperature and as such is not a practical solution. The use of reagents such as dimethyl phosphonate (Polymer Degradation and Stability, (2000), 67, p 159) is also not appropriate since they are highly toxic and act too slowly at room temperature.

The strategies disclosed above do not adequately address the need for the development of a surface treatment to improve the adhesion of aged or inert organic coatings to additional coating layers and/or other entities. The problems of commercial viability, health and safety considerations, viable kinetics, applicability to small and large surface areas still remain and need to be resolved.

SUMMARY

We have now found a method which allows the activation of organic coatings to improve their adhesive properties towards further coating layers of the same or different type, and/or other entities without compromising coating integrity, via the use of mild reagents and conditions.

The term "mild" in this context refers to chemicals which are not known to be excessively corrosive, acidic, basic or toxic and are applicable for use in highly regulated industrial environments. One example of such an environment is a commercial aircraft paint hangar.

Advantageously, this method no longer requires the traditional methods of mechanical abrasion or chemical stripping of an organic coating to improve its adhesive properties towards additional coatings and/or other entities.

In a first aspect, the present invention provides a method of activating an organic coating to enhance adhesion of the coating to a further coating and/or other entities comprising applying a solvent and an adhesion promoter to a surface of the organic coating, wherein contact of the organic coating with the solvent or the solvent and adhesion promoter combination results in swelling of the organic coating.

In another aspect, the present invention provides a coated substrate having an activated organic coating, wherein the adhesion of the activated coating to a further coating and/or other entities has been enhanced by application of a solvent and an adhesion promoter to the surface of the activated coating, such that contact of the organic coating with the solvent or the solvent and adhesion promoter combination results in swelling of the organic coating.

The solvent and the adhesion promoter may be applied either simultaneously, sequentially or separately. Advantageously, the solvent and adhesion promoter are combined and applied to the organic coating in the form of an activation treatment.

In a further aspect, the present invention provides an activation treatment for an organic coating to enhance adhesion of the coating to a further coating and/or other entities comprising an adhesion promoter and a solvent, wherein contact of the organic coating with solvent or the solvent and adhesion promoter combination results in swelling of the organic coating.

In a further aspect, the present invention provides a method for the preparation of the activation treatment defined above comprising the step of mixing the solvent with the adhesion promoter.

DETAILED DESCRIPTION

In this specification, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

As used in the specification the singular forms "a" "an" and "the" include plural references unless the context clearly dictates otherwise. Thus, for example, reference to "a solvent" includes mixtures of solvents, reference to "an adhesion promoter" includes mixtures of two or more such adhesion promoters, and the like.

The method of the present invention involves activating an organic coating so as to enhance the adhesive properties of at least the surface of the coating towards additional coating layers and/or other entities, for example, adhesives, sealants, fillers, stickers and the like. The term 'activating' is used in this context to mean the improvement of the adhesive properties of the organic coating relative to the adhesive properties of that coating, prior to application of the solvent and adhesion promoter.

The word "coating" is used herein its broadest sense and describes decorative topcoats; undercoats; intermediate coatings; primers; sealers; lacquers; coatings which are pigmented or clear; coatings designed for specific purposes, such as, corrosion prevention, temperature resistance, or camouflage; coatings which are high gloss, matte, textured, or smooth in finish; or coatings containing specialty additives, such as, metal flakes.

In general, organic coatings which are cured, dried or aged beyond a certain time period develop resistance to forming strong adhesive linkages towards other entities. Their surface properties become more inert than might be predicted, based on the chemistry of their individual components alone. Without wishing to be limited by theory, it is believed that this phenomena may result from a reduction in coating surface energy and amount of reactive surface functional chemical groups in conjunction with a higher cross-link density as a function of cure time/aging which makes chemical interaction and/or the formation of strong adhesive linkages with other entities difficult.

The organic coatings which may be activated include, but are not limited to, fully or partially cross-linked organic coatings. Examples of organic coatings include, polyurethane, epoxy, polyester, polycarbonate and/or acrylic coatings, more preferably polyurethane coatings. Due to their superior mechanical properties and resistance to abrasion, chemical attack, and environmental degradation, such organic coatings are widely used to protect infrastructure in the aerospace, marine, military, automotive, and construction industries. Many of these coatings show a marked reduction in adhesion to other entities, such as additional coating layers, adhesives, sealants, pressure sensitive decals or logos and the like, with increased time of curing and/or aging.

The activation method involves applying the solvent and the adhesion promoter to a surface of the organic coating. The surface treatment is not a primer coating but rather a chemical method of modifying the surface of the existing coating so that it is more receptive to forming adhesive interactions with further coatings and/or other entities.

Without wishing to be limited by theory, it is believed that a suitable choice of solvent(s) and/or solvent(s)-adhesion promoter(s) combinations allows the coating to be reversibly swollen (expanded). This allows the adhesion promoter(s) to penetrate the highly-chemically-resistant coating surface and engage in attractive interactions with the existing coating, for example molecular entanglement, physiochemical interactions such as hydrogen bonding, or chemical linkages such as covalent or ionic bonds. Upon evaporation or partial evaporation of the solvent(s) and/or adhesion promoter(s), the coating surface is left disordered, with at least some of the securely-tethered functional adhesion promoters protruding from the surface and hence available to form adhesive linkages with separate entities through molecular entanglement, physiochemical, or chemical interactions.

Preferably the solvent and/or adhesion promoter only swell the surface of the organic coating so that the integrity of the first or lower coatings or the underlying substrate are not compromised.

The solvent may be a single solvent or a combination of two or more solvents. Preferably the solvent is an organic solvent. Suitable organic solvents or solvent combinations include:

Ester based solvents such as ethyl acetate, propyl acetate, isopropyl acetate, butyl acetate, isobutyl acetate and tertiary butyl acetate, acetates based on glycols such as ethylene and propylene glycol repeat units for example glycoletheracetates such as ethyleneglycol-monoetheracetate and diethylene glycol-monoetheracetate and dipropylene glycol monoether acetate where the ether residue may be aliphatic (methyl, ethyl, butyl etc) or optionally aromatic (benzene derivatives);

Ketones such as methyl ethyl ketone, methyl amyl ketone, methyl isoamyl ketone, methyl propyl ketone, methyl isobutyl ketone and acetone;

Alcohols such as benzyl alcohol; tertiary butanol; isopropanol; and mono and dihydroxy glycols based on ethylene and propylene glycol repeat units such as ethylene glycol, diethylene glycol, ethylene glycol monoether, diethylene glycol monoether dipropylene glycol and dipropylene glycol monoether, where the ether residue may be aliphatic (e.g. methyl, ethyl, butyl etc.) or optionally aromatic (e.g. benzene derivatives);

Ethers based on ethylene and propylene glycol repeat units such as ethylene glycol diether, diethylene glycol diether, triethylene glycol diether and dipropylene glycol diether where, the ether residue may be aliphatic (methyl, ethyl, butyl etc) or optionally aromatic (benzene derivatives) (tetrahydrofuran);

Amides such as N-methylpyrrolidinone and dimethylacetaminde;

Aromatics such as toluene and xylene; and

Halogenated solvents such as dichloromethane and tetrachloroethylene.

However, in view of the toxicity and negative environmental impact of halogenated solvents, it will be understood that they should be used within the constraints of environmental, health, and safety regulations.

More preferred solvents are ester based solvents such as ethyl acetate, isopropyl acetate tertiary butyl acetate and glycoletheracetates; ketone solvents such as methyl amyl ketone and methyl isoamyl ketone; alcohols such as benzyl alcohol, isopropylalcohol and glycolmonoethers; ether solvents gylcoldiethers; amide solvents such as N-methylpyrrolidinone; chlorinated solvents such as dichloromethane and dichloroethylene.

More preferred solvent combinations include high and low boiling point solvent combinations such as N-methyl pyrrolidinone: ethyl acetate; dichloromethane: benzyl alcohol; ethyl acetate: benzyl alcohol; ethyl acetate: diglycol ether dimethyl ether; and isopropylalcohol:ethoxyethylacetate.

Particularly preferred solvents are ester based solvents such as ethyl acetate and isopropyl acetate, t-butylacetate and glycoletheracetates based on ethyleneglycol and propyleneglycol repeat units; and ketone solvents such as methyl amyl ketone and methyl isoamyl ketone and ether based solvents such as glycoldiethers.

The solvent(s) are generally present in the activation treatment in an amount of less than about 99.9%, preferably greater than about 50%, most preferably in an amount of about 50 to about 99.9% based on the total weight of the combination of solvent(s), adhesion promoter(s) and any optional additive(s).

The adhesion promoter is preferably a compound having at least one functional group. More preferably, two or more functional groups are present and under these circumstances they can be of the same or different functionality. Examples of such functional groups include but are not limited to amine, alcohol, carboxylic acid, amide, ester, thiol, ether, epoxy, isocyanate, isothiocyanate and anhydride groups. Adhesion promoters with nucleophilic functional groups are preferred. Particularly preferred are adhesion promoters with functional groups based on amines and/or alcohols.

The adhesion promoter may take the form of a linear molecule, or alternatively it may take a branched, hyperbranched or dendritic structure. It may be a discrete molecule or a polymer with a molecular weight distribution.

Adhesion promoters with molecular weights less than about 100,000 have been found to be suitable. Preferably, the molecular weight is less than about 10,000 to achieve suitable activation kinetics.

Suitable adhesion promoters include linear and branched polyethylene imines (PEI); amine, epoxy, isocyanate and/or hydroxyl terminated polyether glycols such as polyethylene glycol, polypropylene glycol and/or polyethylene oxide; dendrimers such as polypropylene imine octamine dendrimer and/or polypropylene imine tetraamine dendrimer; and low molecular weight amines such as ethylene diamine, diethylene tetraamine, triethylene tetraamine (TETA), tetraethylene pentamine, pentaethylene hexamine, piperazine, aminoethylpiperazine, 1,4-bis(3-aminopropyl)piperazine, N,N'-bis(3-aminopropyl)ethylenediamine, 4,9-dioxa-1,12-dodecanediamine, 2,2'-(ethylenendioxy)bis(ethylamine), 4,7,10-trioxamidecane-1,13-diamine (TODA), 4,7-dioxadecane-1,10-diamine (DODA), polyetheramine T 403, N,N-bis(3-aminopropyl)-ethylene diamine, 3-2(2-aminoethyl) aminopropyl amine, dipropyltriamine and 4,4' diaminodicyclohexylamine; aminosilanes such as trimethoxysilyl(propyl)diethylenetriamine; epoxysilanes; glycidylethers such as trimethanolpropane triglycidylether and polyethylene glycol diglycidylethers; aziridines such as trimethylolpropanetris(3-aziridinopropionate); and acids such as polyethylene glycoldicarboxylic acid or combinations thereof.

Preferred adhesion promoters are amines such as TODA and/or DODA.

Preferred combinations of adhesion promoters include high and low molecular weight adhesion promoter combinations such as high and low molecular weight polyethylene imines and high and low molecular weight polyether glycols, for example, 4,9-dioxa-1,12-dodecane diamine and polypropylene glycol. Other preferred combinations include aminosilanes such as trimethoxysilyl(propyl)diethylenetriamine and epoxy compounds such as trimethanolpropane triglycidylether; 4,7,10-trioxamidecane-1,13-diamine and epoxy silanes such as trimethylsilyl(propyl)glycidylether; and aziridines and trimethylolpropanetris(3-aziridinopropionate), acids such as polyethylene glycol dicarboxilic acid or glycols such as glycol derivatives.

The adhesion promoter(s) are generally present in an amount more than about 0.01%, preferably more than about 1%, more preferably up to about 50% and most preferably about 1% to about 50% based on the total weight of the combination of solvent(s), adhesion promoter(s) and any optional additives.

One or more additives known in the art of coatings may also be used in the method or activation treatment of the present invention. Suitable examples include rheology modifiers such as hydroxypropyl methyl cellulose (e.g. Dow, methocell 311), modified urea (e.g. Byk 411, 410) and polyhydroxycarboxylic acid amides (e.g. Byk 405); film formers such as esters of dicarboxylic acid (e.g. Lusolvan FBH, BASF) and glycol ethers (e.g. Dowanol, Dow); wetting agents such as fluorochemical surfactants (e.g. 3M Fluorad) and polyether modified poly-dimethyl-siloxane (e.g. Byk 307/333); surfactants such as fatty acid derivatives (e.g. Akzo, Bermadol SPS 2543) and quaternary ammonium salts; dispersants such as non-ionic surfactants based on primary alcohols (e.g. Merpol 4481, Dupont) and alkylphenol-formaldehyde-bisulfide condensates (e.g. Clariants 1494); substrate cling agents; anti foaming agents; anti corrosion reagents such as phosphate esters (e.g. ADD APT, Anticor C6), alkylammonium salt of (2-benzothiazolylhio) succinic acid (e.g. CIBA, Irgacor 153) and triazine dithiols; stabilizers such as banzimidazole derivatives (e.g. Bayer, Preventol BCM, biocidal film protection); levelling agents such as fluorocarbon-modified polymers (e.g. EFKA 3777); pigments such as fluorescents (Royale Pigment and chemicals), and organic and inorganic dyes such as fluoroscein.

The additives are usually present in an amount of less than about 10% based on the total weight of the combination of solvent(s), adhesion promoter(s) and optional additive(s).

The substrate for the above methods having an activated coating may be of any type including metals such as aluminum; composites such as epoxy-carbon fibre composites; or materials containing plastics, glass, wood or fabric. There may also be various "sub" coating layers beneath the coating requiring reactivation including other decorative coating layers, primers, intermediate layers, conversion or anticorrosion coating layers and the like.

When the solvent and adhesion promoter are combined and applied in the form of an activation treatment this may take different physical forms such as solution, suspension, mixture, aerosol, emulsion, paste or combination thereof. Treatments which take the form of a solution or emulsion are preferred.

The activation treatment may be prepared by mixing the components together with any mixing equipment known to those skilled in the art such as but not limited to stirrers, shakers, high speed mixers, internal mixers, extruders, mills, ultra-sound and gas dispersers. When the activation treatment is in the form of a solution, the solution may be prepared as a concentrate and diluted before use or prepared ready for use.

The activation treatment or the application of the individual components thereof may be applied via any method known to those skilled in the art such as but not limited to spray, brush, dip, knife, blade, hose, roller, wipe, curtain, flood, flow, mist, pipette or combinations thereof. Application by spray is preferred.

The method of activation may be conducted at ambient temperatures or alternatively at higher temperatures if desirable. The activation treatment or individual components thereof may be applied to small or large areas, to sections of larger parts, components or full infrastructure such as infrastructure associated with the aerospace (e.g. aircraft), automotive (e.g. vehicles), marine (e.g. ships), transportation (e.g. trains), military (e.g. helicopter, missile) or construction industries (e.g. buildings, factories, floors). The surface may have simple or complex geometry or may be at any inclination. Treatment may be conducted once or multiple times prior to interaction with the separate entity. The exposure time of the activation treatment on the coating is more limited by the throughput and applications requirements. As such the exposure time may be short for example one minute or extended for example 3 h.

In certain circumstances it may be preferable to remove excess non interlocked adhesion promoter and/or solvent from the surface. This process may be conveniently carried out by techniques such as solvent or water rinsing; dry, water or solvent wiping; air or gas knife; vacuum application; squeegee; and/or natural or forced connection evaporation.

After the coating surface is activated, separate entities such as additional coating layers, adhesives, sealants, pressure sensitive decals or logos and the like may be applied either immediately or at a later time, providing the surface remains predominantly uncontaminated during storage or that the contamination can be conveniently removed. The activation solution may need to be reapplied in some cases.

Any suitable method known to those skilled in the art may be used to assess whether the adhesive linkage between the organic coating and further coatings and/or other entities is fit for purpose. Such tests include but are not limited to ASTM, ISO, and FAA standards, in-house test methods to simulate in-service performance, in-service performance itself, and durability testing either actual or accelerated. For the case of aerospace coatings, test methods based on water impact, such as the Whirling Arm Rain Erosion or the Single Impact Jet Apparatus (MIJA Limited, Cambridge, UK), have been found to be particularly useful for assessing inter-coat adhesion. In this case, the amount of overcoat removal is related to the level of inter-coat adhesion.

BRIEF DESCRIPTION OF DRAWINGS

In the Examples, reference will be made to the accompanying drawings, in which:

FIGS. 46-47 compare chemical activation with preparation by sanding.

EXAMPLES

Figure 1:
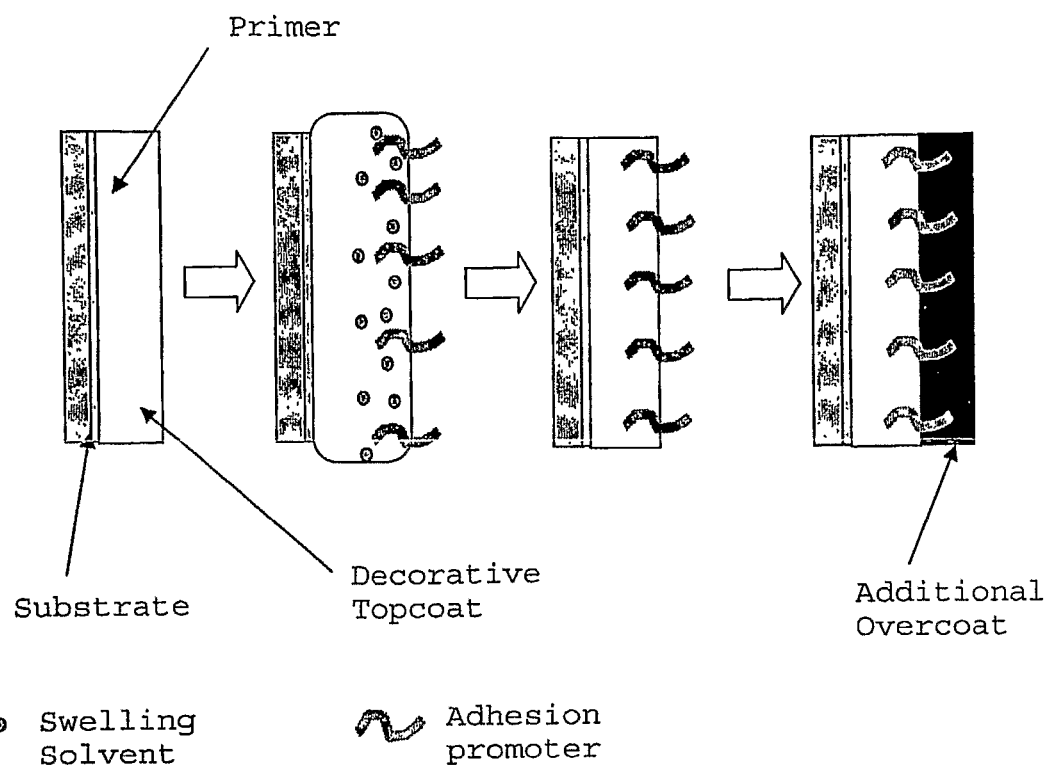
FIG. 1 is a schematic diagram showing the general activation strategy.

The invention will now be described with reference to the following non-limiting examples. The following abbreviations are used in the examples:

TODA—4,7,10-trioxa-1,13-tridecanediamine
PEI—polyethylene imine
TETA—triethylene tetraamine
PEG-DGE—polyethylene glycol diglycidyl ether
IPA—isopropyl acetate
EEA—ethoxyethylacetate
SOLO—spray on-leave on SOHO—spray on hose off
MEK—methylethylketone
DABCO—diaminebicyclooctane Although the examples concentrate on coatings derived from polyurethane chemistries it will be understood that the same activation methodology could be applied to coatings such as but not limited to those based on epoxy, acrylic or polyester coatings through the appropriate choice of solvent(s), adhesion promoter(s) and optional additives under appropriate activation conditions.

1. Inter-coat adhesion of polyurethane paint as function of cure conditions/age
2. Effect of different solvent used in the surface activation treatment on inter-coat adhesion
3. Effect of different adhesion promoter used in the surface activation treatment on inter-coat adhesion
4. Effect of different adhesion promoter concentration used in the surface activation treatment on inter-coat adhesion
5. Effect of surface activation treatment time on inter-coat adhesion
6. Effect of substrate inclination (angle) on application of the surface activation treatment and resultant inter-coat adhesion
7. Effect of additives used in the surface activation treatment on inter-coat adhesion
8. Effect of dwell time between activation and re-coating on inter-coat adhesion
9. Impact of different application methods for applying the activation treatment on the resultant inter-coat adhesion
10. Impact of different post treatment steps to remove excess treatment and/or solvent on the resultant inter-coat adhesion
11. Effect of different paint types and curatives on the activation treatment and resultant inter-coat adhesion
12. Durability of coatings applied to activated substrates
13. Inter-coat adhesion between aged and then activated organically pigmented coating towards an additional coating layer
14. Adhesion data from Whirling Arm Rain Erosion and SIJA experiments of activated and re-coated specimens relative to specimens sanded prior to over-coating
15. SEM analysis of coating layers
16. Raman Spectroscopy illustrating activation solution penetration depth
17. Analysis of coating surface by XPS prior to and following activation
18. Scribe adhesion illustrating rapid build-up of intercoat adhesion in chemically reactivated samples
19. Intercoat adhesion of samples activated with two adhesion promoters (SOLO)
20. Intercoat adhesion of chemically activated sample in solvent mixture (SOLO)
21. Scribe and SIJA intercoat adhesion of samples activated with two adhesion promoters (SOLO)
22. Intercoat adhesion of specimen activated over a vinyl mask prior to overcoating
23. Sealant immersion compatibility
24. Epoxy-graphite fibre composite immersion compatibility
25. Sealant immersion compatibility
26. Epoxy-graphite fibre composite immersion compatibility
27. Paint stripping
28. Impact of thermal cycling on surface activity and inter-coat adhesion All the components of the activation treatment influence the physical properties of the treatment and hence its ability to interact with the coating. Such impacts can be assessed theoretically by using solubility parameters (Hanson, Hanson solubility Parameters—a users hand book, CRC, NY, Van Krevelen, D. W., Hoftyzer, P. J., Properties of Polymers—their estimation and correlation with chemical structure, Elsevier, NY) or UNIFAC (Hansen H. K., et al. Ind. Eng. Chem. Res 1991; 30 (10) p 2352) to estimate the contribution of the individual components to the total interaction parameter of the activation treatment.

It is envisaged that suitable combinations of components of the activation treatment will differ depending on the type of coating to be activated. The appropriate choice of solvent(s), adhesion provider(s), optional additives and activation conditions will differ depending on the type of coating to be activated.

GENERAL EXPERIMENTAL DETAIL

1. Aluminium Pre-Treatment

Aluminium test coupons (Alcad 2024-T3) or Rain erosion Foils (Alcad 2024-T3) were cleaned and an Alodine type conversion coating was applied prior to painting.

2. Painting Conditions and Protocol

An epoxy based primer was used for all samples. Desothane HS (Registered Trade Mark) polyurethane topcoats were employed for all trials using the standard flow control agent (CA 8000C) unless specified. The base CA8000:activator CA8000B:flow CA8000C ratio employed was also calculated on a weight basis (121.06:51.32:39.81 for white 7067) unless stated in the example. Following component addition, both primer and topcoats were shaken for 15 min in a "Red Devil" paint shaker and allowed to stand for a further 15 min prior to painting.

Spray painting of flat panels was carried out employing a robotic painting arm incorporating a gravity fed automatic spray gun. Spray painting was conducted using an inlet pressure of 40 PSI, a scan rate of 100 mm/s and a specimen to gun distance of 300 mm. A single pass was employed for the application of the primer whilst four individual passes were required for the top-coats allowing "tack-up" time between each individual pass. The coating thickness was controlled by the gun's fluid needle control position and scan rate with these adjusted in line with paint thickness measurements assessed using a Fischer Isoscope (MPOD). An analogous strategy was employed for the application of the overcoat, Desothane HS polyurethane. For the majority of the research the painted films were over-coated following taping of the top and bottom of the coupons with vinyl tape to form a leading paint edge on its removal. This edge was the impact target for SIJA analysis. Later investigations applied the tape through the middle of the coupon.

TABLE 2

Painting & Cure Schedule

| Task | Conditions |
| --- | --- |
| Polyurethane Top-coat | Conducted on the same day as the primer Cure: 18 h, 49° C., 10-22% relative humidity, Thickness ~100 micron (measured each batch) Alternatively: Conducted on the same day as the primer Cure: ~116 hrs: a) 120 F., 8-12% RH, 44 hrs b) 120 F., 50% RH, 48 hrs c) 160 F., 3-5% RH, 24 hrs Thickness ~100 micron (measured each batch) |

TABLE 2-continued

Painting & Cure Schedule

| Task | Conditions |
|---|---|
| Surface modification and/or analysis | Generally conducted directly following completion of the cure cycle or on the following day |
| Polyurethane over-coat repainting | Painting conducted on the same or next day following treatment.<br>Cure: 40 h, 49° C., 10-22% relative humidity, Thickness ~100 micron (measured each batch) |

Spray painting of curved surfaces (eg: rain erosion foils) was conducted using a Binks M1-H HVLP gun configured with a 94 nozzle. In these cases the aluminium was prepared in the same manner as the SIJA plates prior to the first top-coat being applied. Following cure of the first coating layer the front of the foils were masked prior to over-coating to form a leading edge once the over-coating was applied and tape removed.

3. Surface Modification

The solvents and reagents used for surface modification were purchased from the MERK and Sigma-Aldrich Chemical Companies of an Analytical and Laboratory Reagent grade purity respectively. The specific adhesion promoter or solvent employed for activation is outlined in the main body of the example.

General treatment conditions are presented in Table 3. Activation of the (cured) 'aged' painted surfaces was conducted either on the same day or next day following completion of curing unless stated in the example.

TABLE 3

General Activation Protocol

| Task | Strategy |
|---|---|
| Treatment | Coupons were placed:<br>Horizontally over a grid and then exposed to the treatment solution from 5 to 180 min, either periodically re-applying the solution or with just one application.<br>At angles of 0, 45, 90, 135° and then exposed to a treatment solution spray at 10 min intervals for 30 min or with one application. |
| Post-Treatment | Washed with isopropanol or water<br>Wiped with an isopropanol or water soaked cloth<br>Used directly for painting (where specified, SOLO) |
| Re-coating | Dry Reactivated coating were either painted on the:<br>Following Day (24 h)<br>Same day (5 min to 4 hours after treatment) |

Application was conducted either by pouring treatment solution over the substrate with a pipette, application with a disposable pump action spray bottle or by using a Binks M1-H HVLP gun employing a 92 or 94 nozzle and 40 psi inlet pressure.

4. Analysis

Table 4 provides the equipment and conditions used for polyurethane surface analysis and adhesion testing.

TABLE 4

Analytical Equipment & Conditions

| Equipment | Conditions |
|---|---|
| FTIR | FTIR analysis was carried out on a BRUKER FTIR/NIR spectrometer or Nicolet Instruments employing an ATR KRS-5 TiBr/TiI mixed crystal associated with the microscope |
| Raman Spectroscopy | Raman spectroscopy was completed on a Renishaw, 1000 Raman microprobe spectrometer employing a 780 nm laser, focusing the laser spot down to 1 micron. Cross sections of the painted films on glass, or aluminium were prepared by cutting the paint film and exposing the cross section to the incident laser beam. |
| XPS | XPS analysis was completed on a Kartos AXISH5 spectrometer at an incident beam of 90° employing an Alumina source to generate survey and high resolution spectra. Curve fitting analysis of the data was completed using GRAMMS RESEARCH software package |
| Contact Angle | Contact angle analysis was completed using "FIRST TEN ANGSTROMS" semi-automated video equipped contact angle analyser. $CH_2I_2$ and $H_2O$ were employed as the reference solvents to calculate the dispersive ($\gamma_s^d$) and polar ($\gamma_s^p$) contributions to surface energy ($\gamma_s$) through the Young-Dupre relationship and Fowkes equation. |
| SEM | SEM analysis of the polyurethane cross-sections were collected on a Oxford Pentafet detector controlled by an Oxford ISIS system. Cross-sections of the samples prepared with a cut off saw appropriate for non-ferrous materials and were mounted in epoxy resin, ground and polished to a 1 micron finish and gold coated. Imaging and x-ray analysis was conducted using a 15 KV accelerating voltage and a 17 mm working distance. EDX analysis was specifically refined for carbon, nitrogen, oxygen, and chlorine. |
| SIJA | Adhesion testing was completed using a Single Impact Jet Apparatus (SIJA) manufactured by MIJA, Ltd in Cambridge, UK. The initial equipment was configured using a 0.8 mm nozzle and employed 0.22 calibre 5.5 mm Crosman Accupell Pointed Pellets (#11246). Testing was completed following immersion in water for 16 to 18 h employing a line laser to locate the impact position and using a 45° specimen to impact droplet geometry. A single water jet was employed at each site to test adhesion with the pressure employed for the "shot" indicated below its impact. The velocity of each individual shot was recorded for future reference, but generally the pressure to velocity conversion is specified below (±25 m/s). |

| Pressure (PSI) | Velocity (m/s ±25 m/s) |
|---|---|
| L | 350 |
| 100 | 725 |
| 200 | 895 |
| 300 | 1007 |
| 400 | 1079 |

Figure 2:
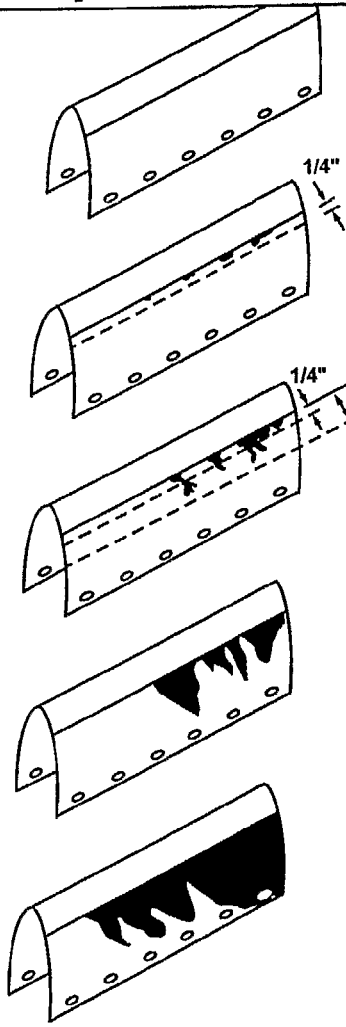
FIG. 2 is a diagram showing whirling arm rain erosion performance assessment.
Figure 3A:
FIGS. 3 A-D show results of intercoat adhesion testing with curing under various conditions.
Figure 3B:
Figure 3C:
Figure 3D:
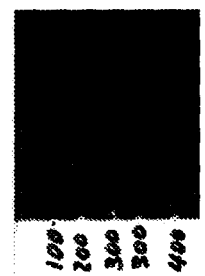
Figure 4:
FIGS. 4-13 show the results of intercoat adhesion testing with treatment with different solvents.
Figure 4:
Figure 4:
Figure 5:
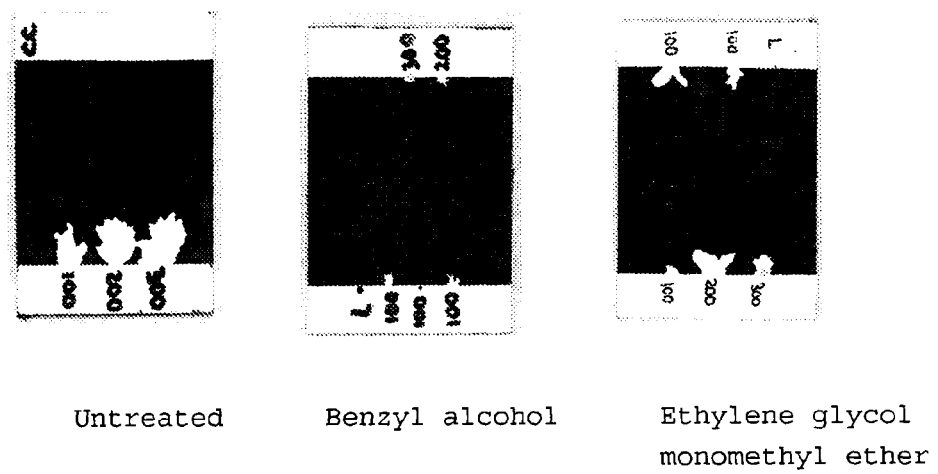
Figure 6:
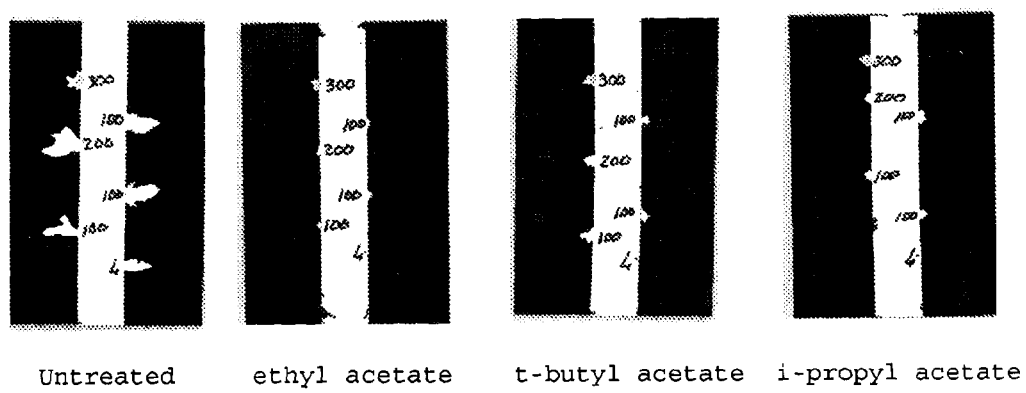
Figure 7:
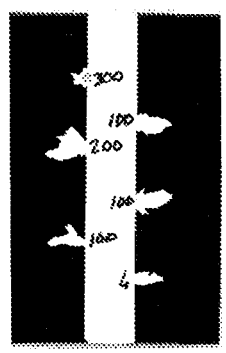
Figure 7:
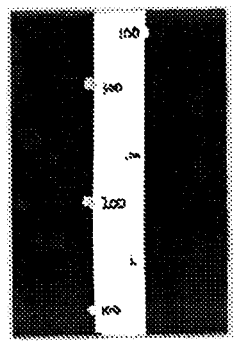
Figure 8:
Figure 8:
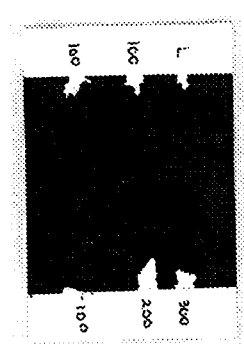
Figure 8:
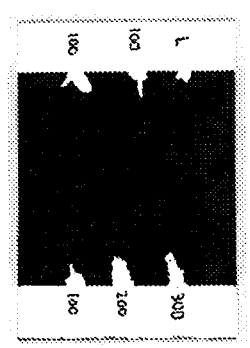
Figure 9:
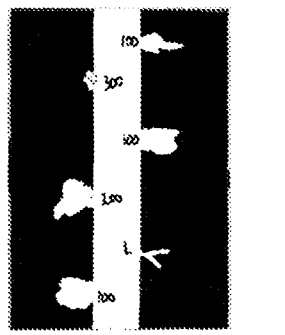
Figure 9:
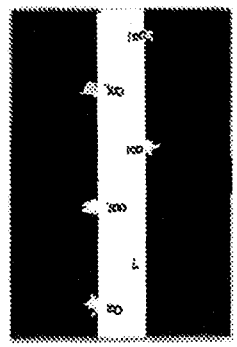
Figure 10:
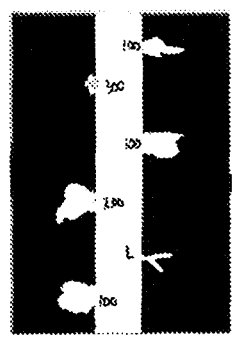
Figure 10:
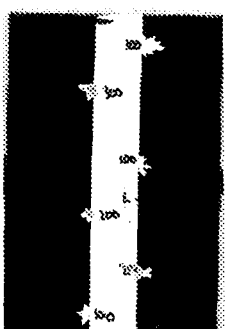
Figure 11:
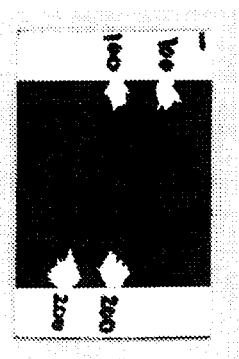
Figure 11:
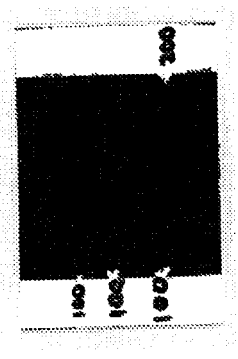
Figure 12:
Figure 12:
Figure 13:
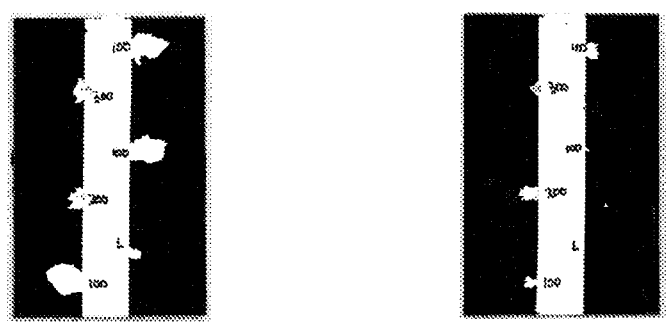
Figure 14:
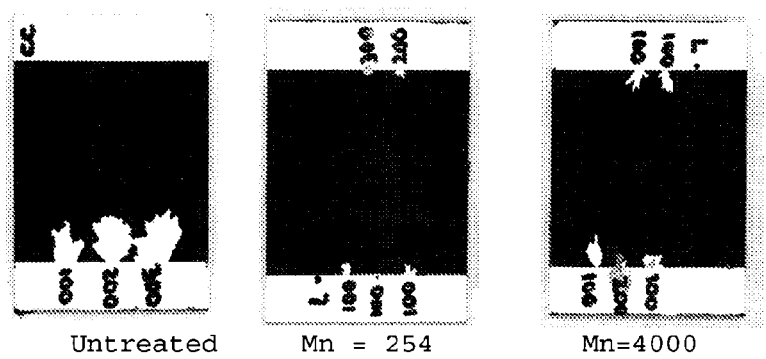
FIGS. 14-22 show the improvement in intercoat adhesion of aged polyurethane treated with various adhesion promoters.
Figure 15:
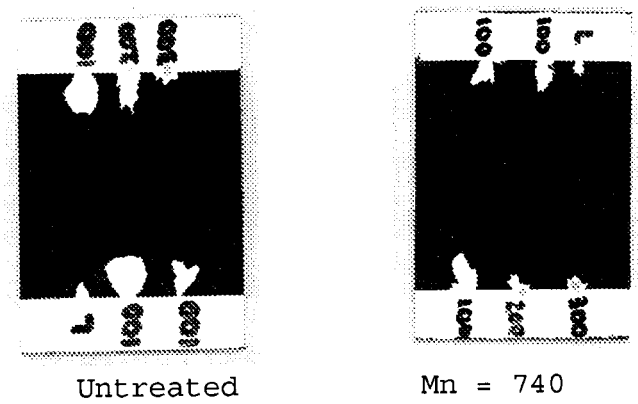
Figure 16:
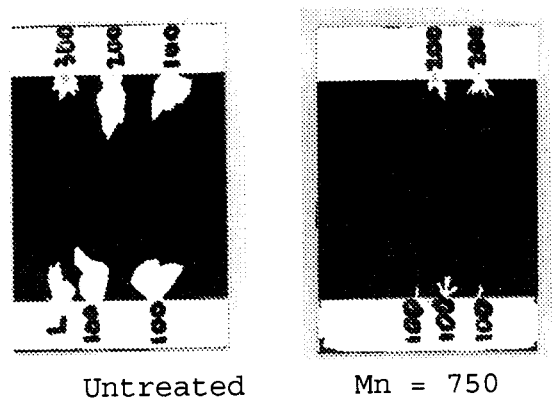
Figure 17:
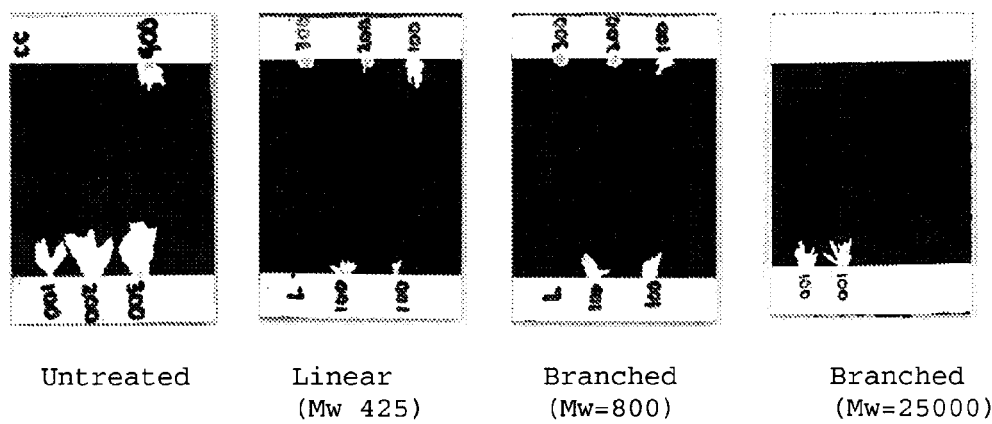
Figure 18:
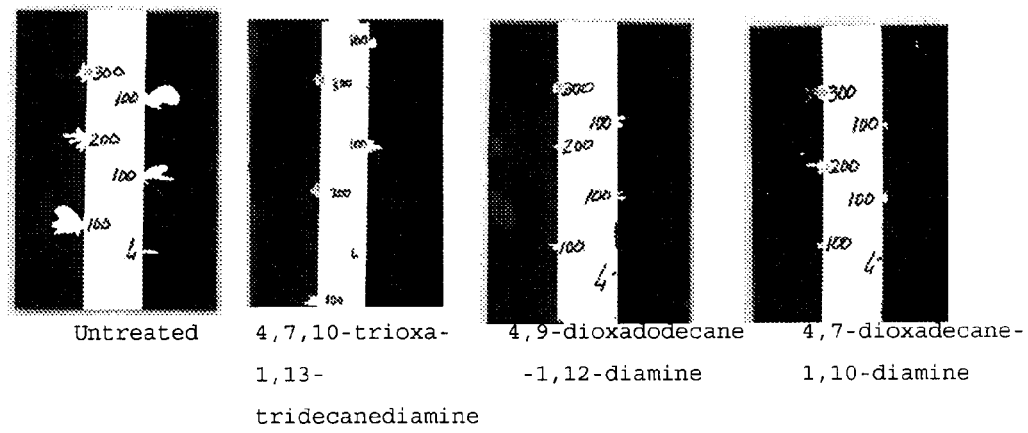
Figure 19:
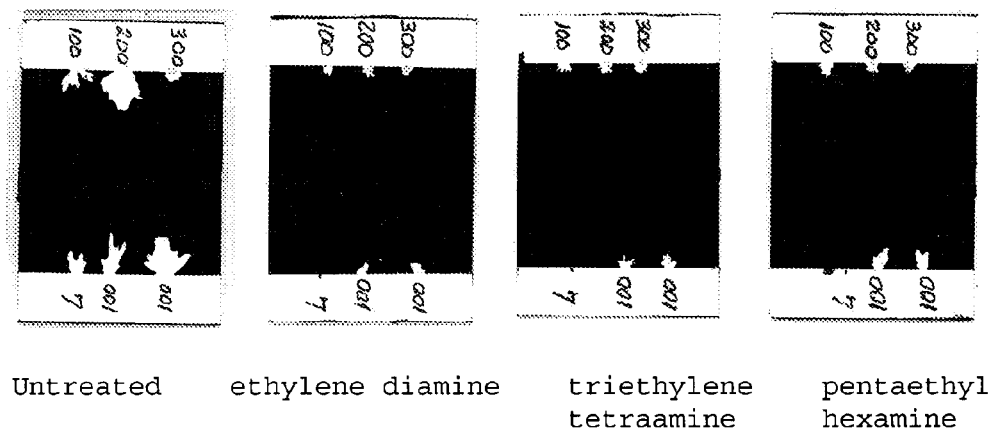
Figure 20:
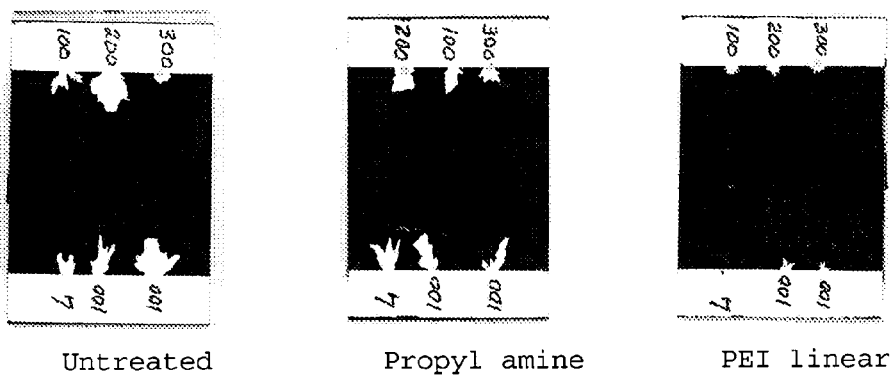
Figure 21:
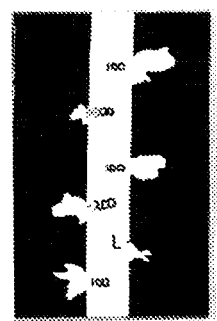
Figure 21:
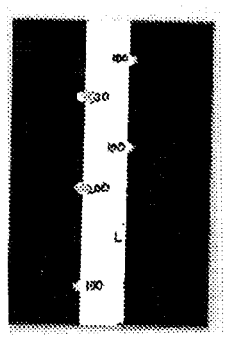
Figure 22:
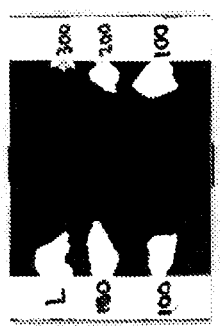
Figure 22:
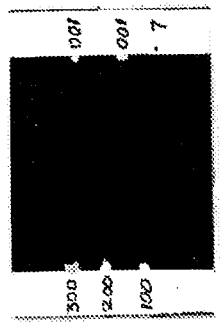

| | |
|---|---|
| | In some cases the amount of overcoat removed, and hence the inter-coat adhesion was assessed employing image analysis techniques to quantify the area of paint removed. More overcoat removed corresponded with inferior inter-coat adhesion |
| Whirling Arm Rain Erosion Testing | Rain erosion testing was completed on a whirling arm rain erosion apparatus employing a 52 inch zero lift helicopter like propeller run at 3600 rpm. Reference and activated polyurethane topcoat foils were over-coated (60 to 100 micron paint thickness) following masking to produce a leading edge. The foils were attached to the propeller at a distance along the propeller correlating to a velocity of 380 mile per hour at the mid point of the foil. The effective rain field density of 2 mm droplets used during the experiment was 1 inch per hour. After 30 min the impact of rain erosion on the inter-coat adhesion of the foils was evaluated according to a 0.5 to 5 rating correlating the amount of paint removed or tear lengths (see FIG. 2). The impact of water droplets on the leading edge of the over-coat formed on removal of the tape during the experiment erodes the over-coating layer relative to the strength of the inter-coat adhesion. |

TABLE 4-continued

Analytical Equipment & Conditions

| Equipment | Conditions |
|---|---|
| Green Adhesion | Green (scribe) adhesion was assessed according to BSS 7225, Class 5. Briefly heat aged Dethothane polyurethane coatings were reactivated and then over-coated (60-80 micron thickness) curing the over-coat for 16 h at room temperature and humidity. The coatings were then scribed according to BSS 7225 and the adhesion test was performed with PG-777 grade tape |
| Paint Stripping | Procedure for the complete strip test is described in SAE MA4872, Annex A, pages 51 to 53 and is similar to BMS10-103 section 8.2.12d on page 13. In this Stage an abbreviated version was completed using CEEBEE-E2012A and Turco-1270-5 paint strippers with out thermal cycling to compare how the activated and over-coated specimens to untreated and reference specimens. Aged specimens (Al or composite substrate, ex-BOEING) were untreated, sanded, or activated were over-coated (60-75 micron) and cured for 40 h at 120° F. The edges were taped with Aluminized tape (such as 3M Scotch Brand 425) prior to commencing the test. |

Example 1

Inter-coat adhesion of white polyurethane painted specimens cured under various conditions prior to over-coating with blue polyurethane as assessed by SIJA:
A. 4 h at 49° C. prior to over-coating
B. 18 h at 49° C. prior to over-coating
C. 156 h at 49° C. prior to over-coating
D. 18 h at 49° C. and then sanded prior to over-coating
Results Indicate:
As shown in FIGS. 3 A-D, excellent inter-coat adhesion is obtained when samples are over-coated within a short cure window (A). Reduced inter-coat adhesion when the cure time or age of samples is increased (B) and (C). Sanding the specimens cured outside their re-application window prior to over-coating (D) re-established the adhesion performance with only limited over-coat paint removal.

Example 2

Inter-coat adhesion as assessed by SIJA of white polyurethane paint cured at 49° C. for 18 h and then treated with the adhesion promoter specified in different solvents prior to over-coating with blue polyurethane.
1. Chlorinated Solvents (amine terminated polypropylene glycol adhesion promoter)—See FIG. 4.
2. Alcohol solvents (amine terminated polypropylene glycol adhesion promoter)—See FIG. 5.
3. Ester Solvents (4,7,10-trioxa-1,13-tridecanediamine adhesion promoter)—See FIG. 6.
4. Ketone Solvents (4,7,10-trioxa-1,13-tridecanediamine adhesion promoter)—See FIG. 7.
5. Ether Solvents (4,7,10-trioxa-1,13-tridecanediamine adhesion promoter)—See FIG. 8.
6. Amide Solvents (4,7,10-trioxa-1,13-tridecanediamine adhesion promoter)—See FIG. 9.
7. Solvent mixtures
   N-methyl Pyrrolidinone:Ethyl acetate (1:1) 4,7,10-trioxa-1,13-tridecanediamine—See FIG. 10.
   Dichloromethane:Benzyl alcohol (1:1) amino terminated polypropylene glycol—See FIG. 11.
   Ethyl acetate:Benzyl alcohol (1:1) 4,7,10-trioxa-1,13-tridecanediamine—See FIG. 12.
   Ethyl acetate:diglycol ether dimethyl ether (1:1) 4,7,10-trioxa-1,13-tridecanediamine—See FIG. 13.
Results Indicate:
As shown in FIGS. 4-13, chemical activation of polyurethane may be conducted with suitable adhesion promoters in a variety of different solvents or solvent combinations to improve inter-coat adhesion relative to samples which are not activated prior to over-coating.

Example 3

The following example show the improvement in inter-coat adhesion of aged polyurethane white coatings (18 h, 49° C.) treated with various adhesion promoters (50%) employing ethyl acetate or benzyl alcohol as the treatment solvent prior to over-coating with blue polyurethane as assessed by SIJA analysis. (Treatment time 30 or 60 min)
1. Amine terminated polypropylene glycol (Benzyl alcohol)—See FIG. 14.
2. Alcohol terminated polypropylene glycol (Benzyl alcohol)—See FIG. 15.
3. Epoxy terminated polypropylene glycol (benzyl alcohol)—See FIG. 16.
4. Polyethylene imine (PEI) (ethyl acetate)—See FIG. 17.
5. Amine functional ether compounds (ethyl acetate)—See FIG. 18.
6. Amine functional compounds (ethyl acetate)—See FIG. 19.
7. Impact of employing a mono-functional adhesion promoter on inter-coat adhesion (benzyl alcohol) (PEI—polyethylene imine linear MW=425)—See FIG. 20.
8. Impact of employing adhesion promoter combinations on adhesion (ethyl acetate)
   PEI (branched MW 25K), 10% & PEI linear 0.43K 50%—See FIG. 21.
   4,7,10-trioxa-1,13-tridecanediamine (40%), diethylene triamine (10%) in benzyl alcohol—See FIG. 22.
Results Indicate:
As shown in FIGS. 14-22, a variety of different suitably functionalised adhesion promoters or adhesion promoter combinations may be employed to improve inter-coat adhesion including those which are polymeric or discrete molecules. Example 3 (7) illustrates that inter-coat adhesion is slightly improved through the use of monofunctional adhesion promoters such as propyl amine, due to the similar amount of over-coat paint removal compared with untreated samples.

Example 4

Figure 23:
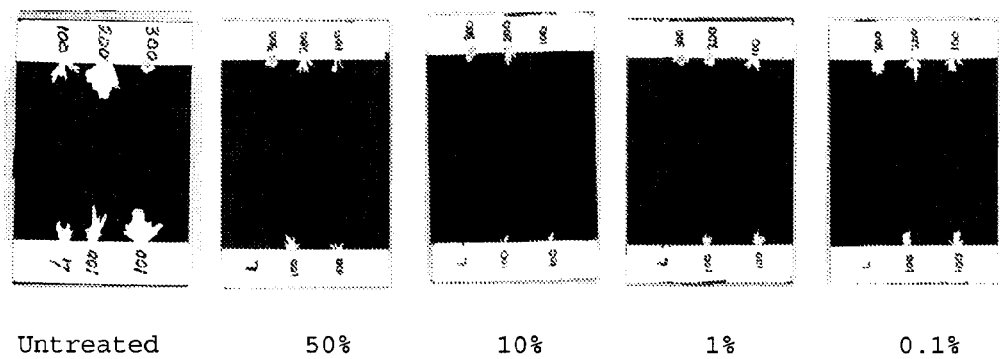
FIGS. 23-24 show the effect of different adhesion promoter concentrations.
Figure 24:
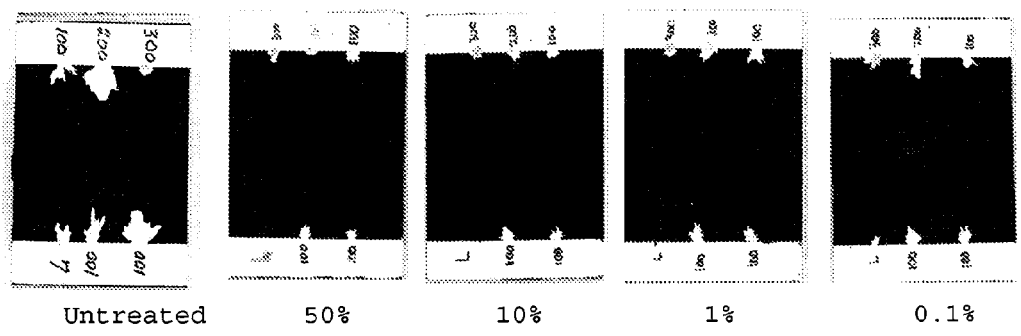

The following example shows the effect of using various adhesion promoter concentrations to improve the inter-coat adhesion of aged polyurethane topcoat (49° C., 18 h) to a blue polyurethane over-coat as assessed by SIJA analysis.
1. PEI (linear) in ethyl acetate, 30 min treatment time—See FIG. 23.
2. 4,7,10-trioxa-1,13-tridecanediamine in ethyl acetate, 30 min—See FIG. 24.
Results Indicate:
As shown in FIGS. 23 and 24, when appropriate adhesion promoter and solvent are employed, the adhesion promoter concentration may be varied whilst still providing an improvement in inter-coat adhesion.

Example 5

Figure 25:
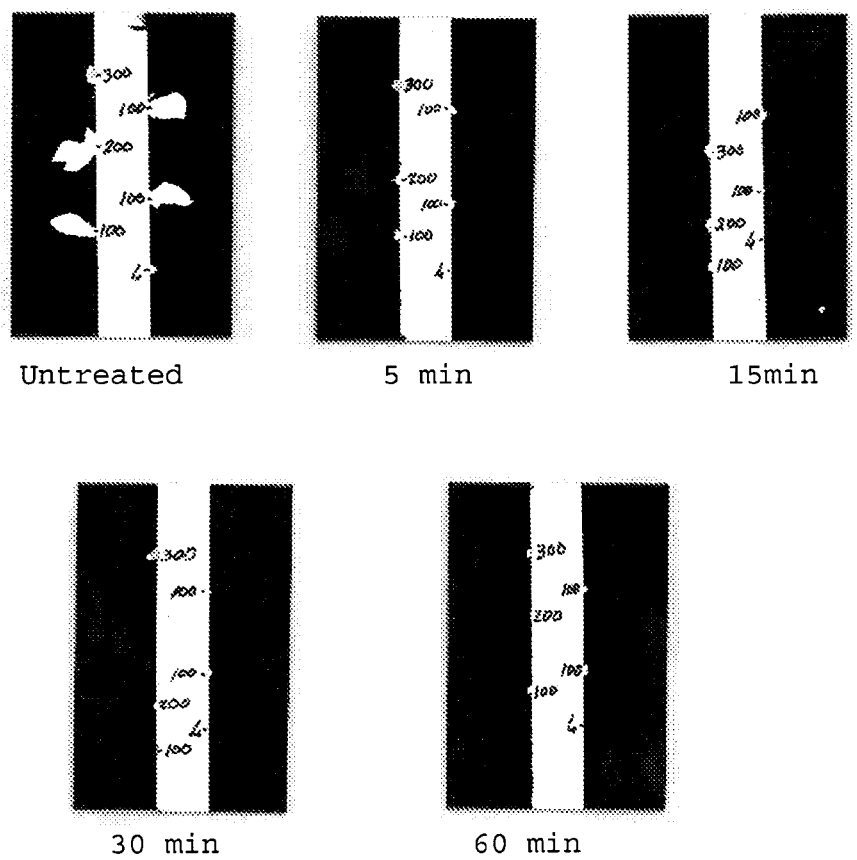
FIGS. 25-26 show the effect of treatment with an activation solution for different periods of time.
Figure 26:
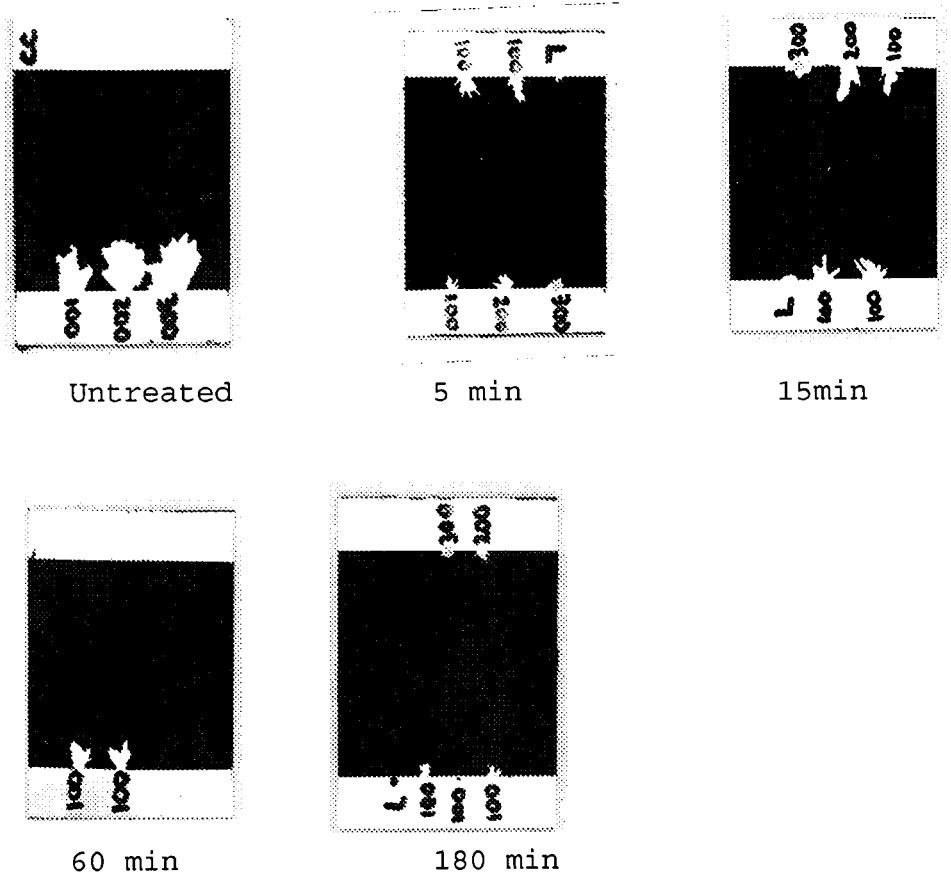

The following example illustrates the effect on inter-coat adhesion of treating aged white polyurethane coating (18 h, 49° C.) with an activation solution for different time periods prior to over-coating with blue polyurethane coating as assessed by SIJA analysis.
1. 4,7,10-trioxa-1,13-tridecanediamine (50%) in Ethyl acetate—See FIG. 25.
2. Amino-terminated Polypropylene glycol (Mn=230) in Benzyl alcohol—See FIG. 26.
Results Indicate:
As shown in FIGS. 25 and 26, the SIJA results indicate that when suitable adhesion promoters and solvents are employed the activation process may be conducted over short or extended periods to improve inter-coat adhesion.

Example 6

Figure 27:
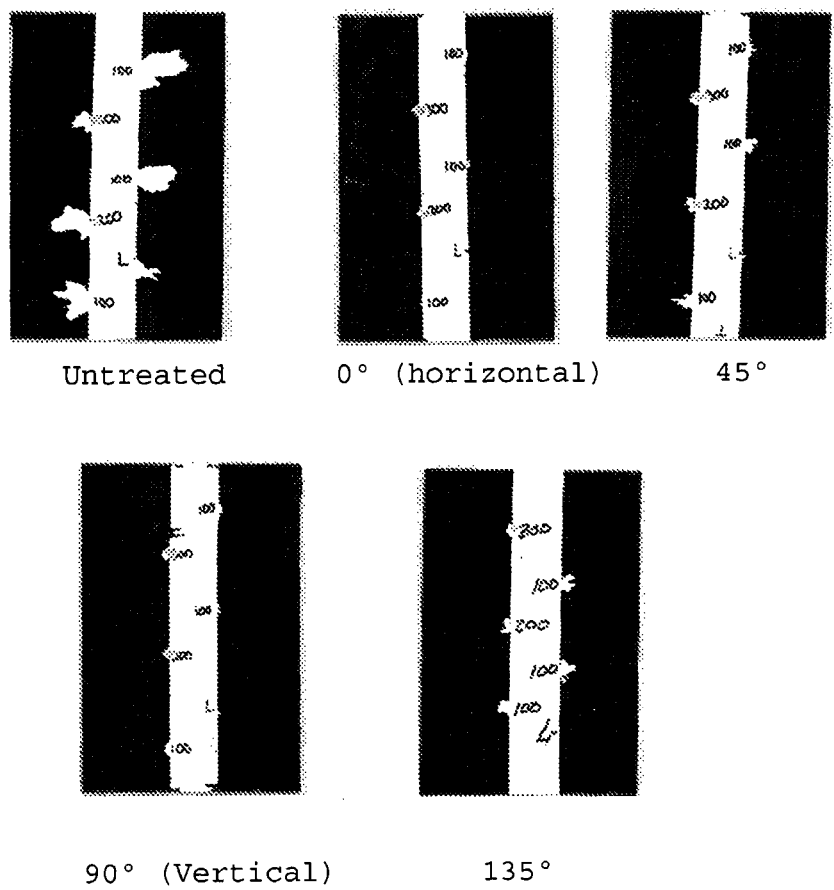
FIGS. 27-28 show the effect of inclination on adhesion.
Figure 28:
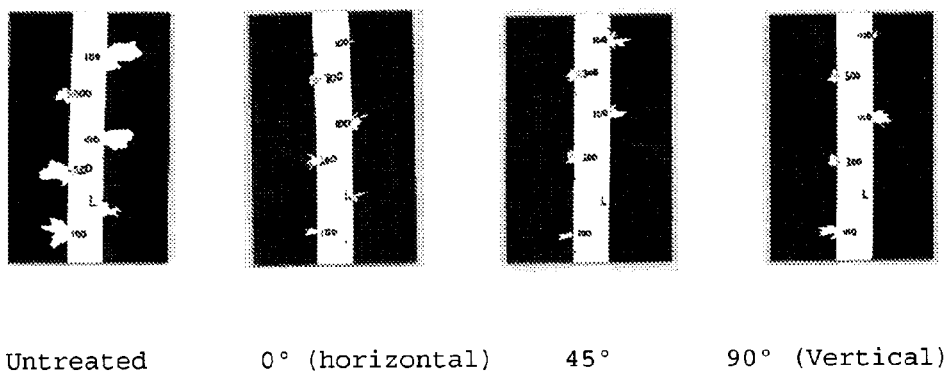

Example 6 shows the effect on inter-coat adhesion as assessed by SIJA analysis of aged white polyurethane coating (49° C., 18 h) activated with suitable adhesion promoters and solvents prior to over-coating with blue polyurethane coating at different inclinations.
A. 4,7,10-trioxa-1,13-tridecanediamine (50%) in ethyl acetate. (30 min treatment time)—See FIG. 27.
2. PEI Linear (50%) in benzyl alcohol (60 min treatment time)—See FIG. 28.
Results Indicate:
As shown in FIGS. 27 and 28, when suitable adhesion promoters and solvents are employed the activation treatment may be used to improve inter-coat adhesion of aged polyurethane substrates at different inclinations and hence is suitable for substrates of different geometries.

Example 7

Figure 29:
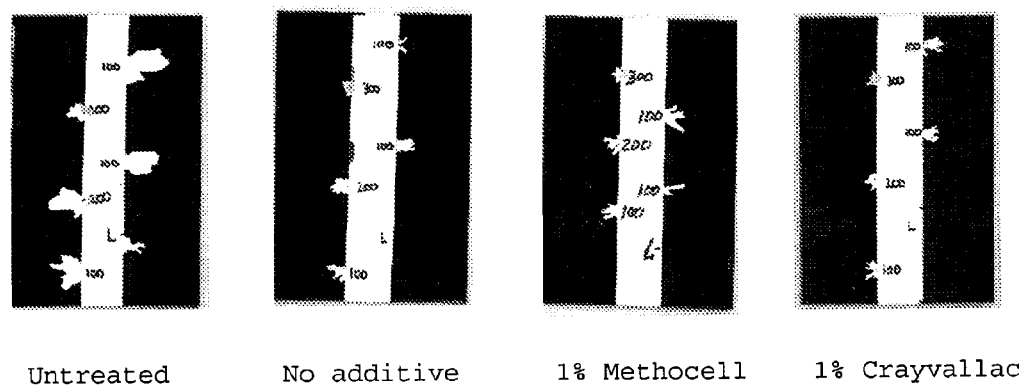
FIGS. 29-30 show the effect of additional additives.
Figure 30:
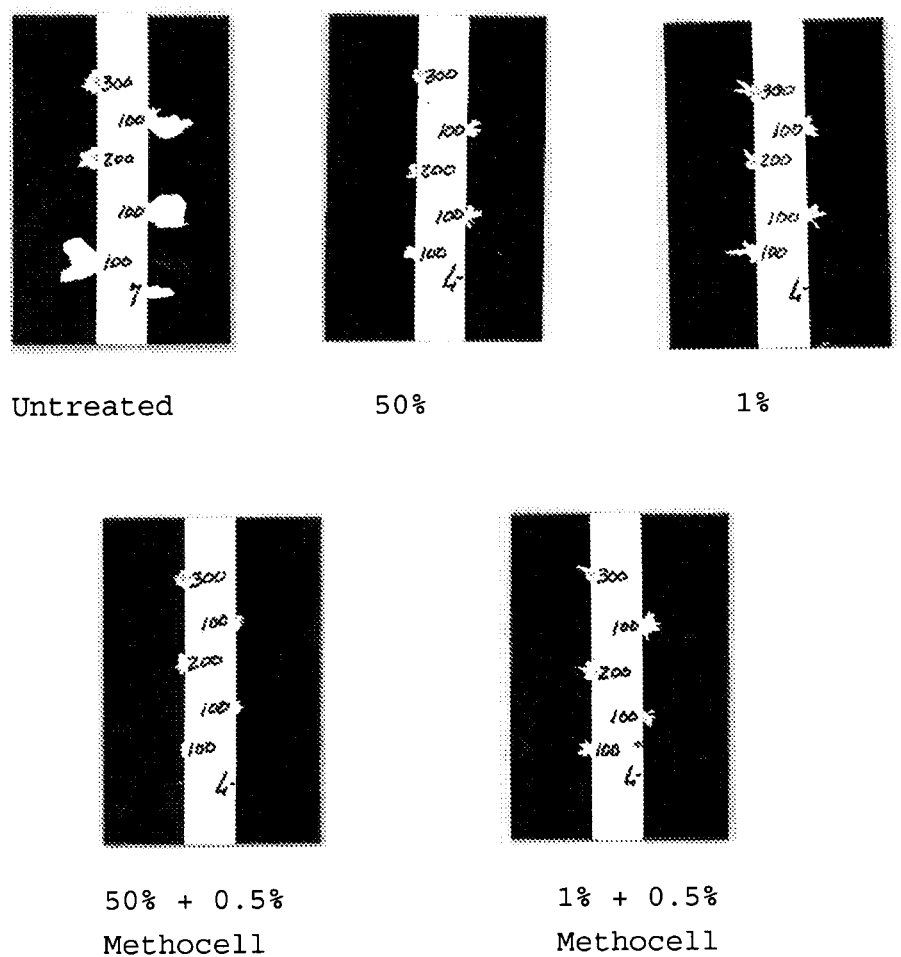

The following example illustrates the effect of including minor amounts of additives (in this case shear thinning rheology modifiers) in the activation treatment solution. In this case an aged polyurethane white coating (49° C., 18 h) was treated with the activation solution prior to over-coating with a blue polyurethane coating and the inter-coat adhesion assessed by SIJA.
A. 10% Polyethylene imine (linear) in ethyl acetate, substrate at 45° incline (30 min treatment time)—See FIG. 29.
B. 4,7,10-trioxa-1,13-tridecanediamine (%) in Ethyl acetate substrate at 90° incline (30 min treatment time)—See FIG. 30.
Results Indicate:
As shown in FIGS. 29-30, additives such as but not limited to rheology modifiers may be added into the activation solution without detrimental impact on the level of inter-coat adhesion improvement as assessed by SIJA techniques. In this case such modifiers limit the amount of activation solution run off during the activation procedure.

Example 8

Figure 31:
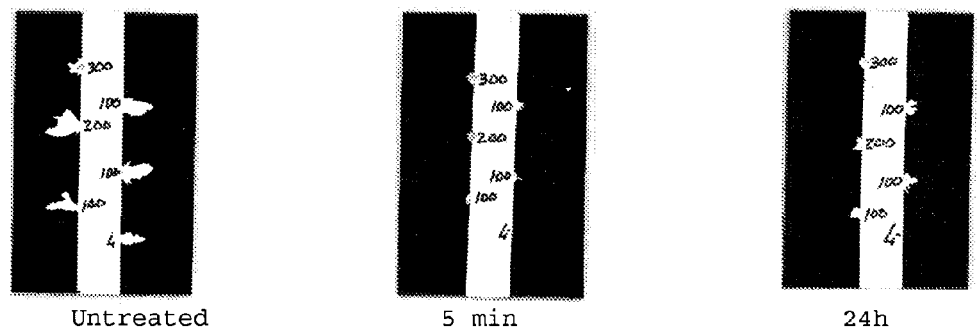
FIGS. 31-32 show the effect of the all-time between activating and over-coating.

Example 8 illustrates the effect of different dwell times between activating the surface of the aged white polyurethane coating (18 h, 49° C.) and over-coating with fresh blue polyurethane employing 4,7,10-trioxa-1,13-tridecanediamine (50% in ethyl acetate, 30 min) as the activation solution.
Results Indicate:
As shown in FIG. 31, specimens may be over-coated employing either a short or longer dwell time between activation and over-coating. As long as the specimens are stored appropriately an improved inter-coat adhesion results as assessed by SIJA methods.

Example 9

Figure 32:
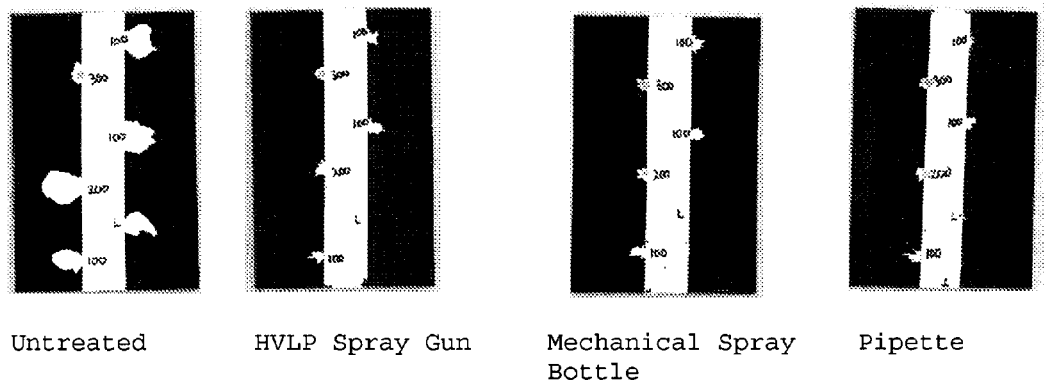

Example 9 shows the impact on inter-coat adhesion of applying the activation solution to the aged white polyurethane coating (49° C., 18 h) by different techniques. Treatment conducted at a 45° angle (4,7,10-trioxa-1,13-tridecanediamine 50% in ethyl acetate, 30 min) prior to over-coating with blue polyurethane.
Results Indicate:
As shown in FIG. 32, improved inter-coat adhesion results as assessed by SIJA techniques regardless of the application method employed.

Example 10

Figure 33:
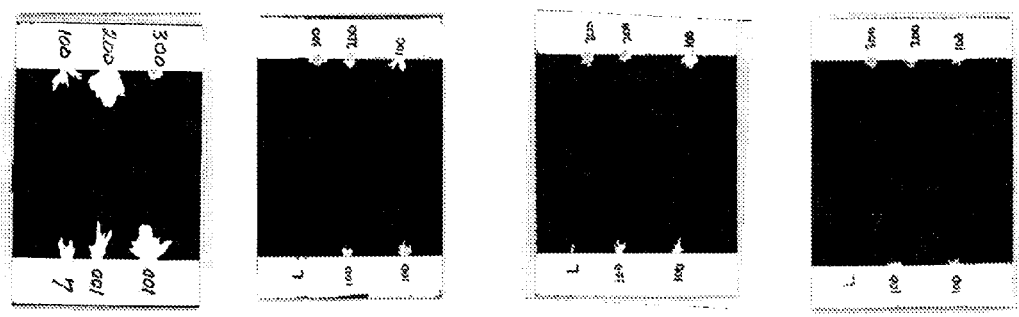
FIG. 33 shows the effect of various post treatment protocols.

Example 10 shows the effect of various post treatment protocols employed following treatment of the aged white coating (49° C., 18 h) with the activation solution (1% 4,7,10-trioxa-1,13-tridecanediamine in ethyl acetate) prior to over-coating with blue polyurethane.
Results Indicate:
As shown in FIG. 33, chemical activation treatment is amenable to a variety of different post treatment steps if required for example those to removed excess adhesion promoter, solvent or contaminant whilst retaining an improved level of inter-coat adhesion as assessed by SIJA analysis.

Example 11

Figure 34:
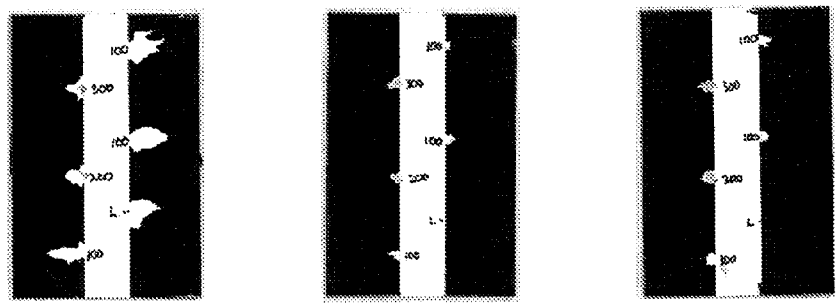
FIGS. 34-36 show the effect of particular adhesion promoters and solvents.
Figure 35:
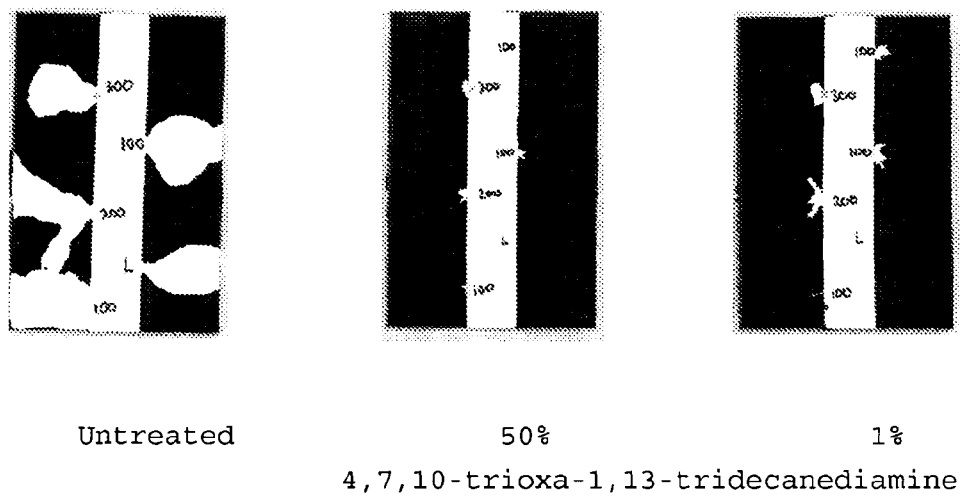
Figure 36:
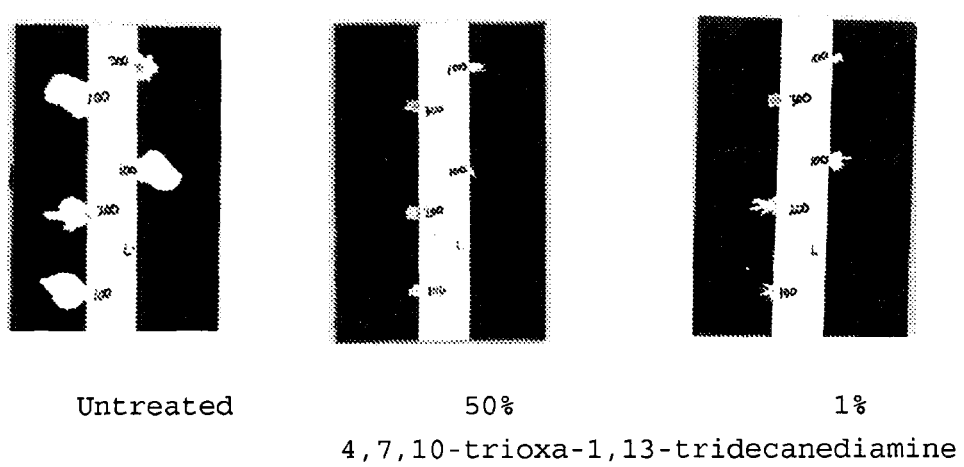

The following example shows how the appropriate adhesion promoters such as 4,7,10-trioxa-1,13-tridecanediamine and solvents (eg ethyl acetate) may be used to improve inter-coat adhesion of aged (49° C., 18 h):
a. polyurethane coatings manufactured by different paint manufacturers and
b. polyurethane coatings cured with hot thinners (ie thinners incorporating higher level of cure catalyst) prior to over-coating with blue polyurethane. Water wash employed following treatment.
A1. PPG Aerospace PRC Desoto—See FIG. 34.
A2. Eclipse Range (Akzo Nobel Aerospace Coatings)—See FIG. 35.
B. Desothane HS cured with hot thinners—See FIG. 36.
Results Indicate:
As shown in FIGS. 34-36, the activation procedure is amenable for improving the adhesion between different types of polyurethane coatings and coating cured with different thinners (catalyst levels) and hence different cure rates and fresh coating layers as assessed by SIJA analysis.

Example 12

Figure 37:
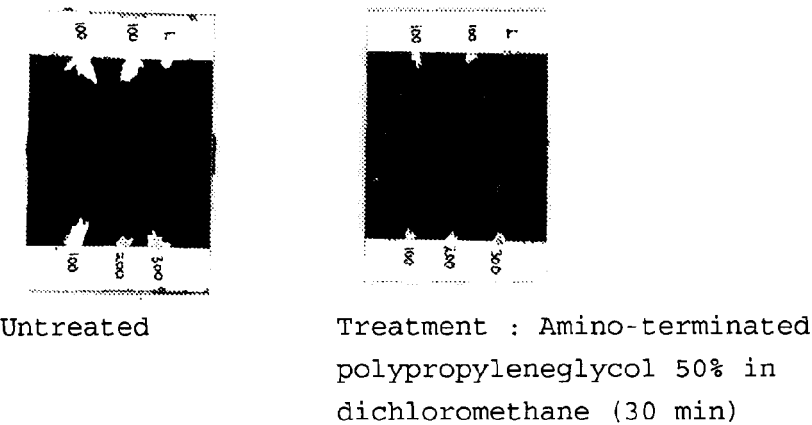
FIGS. 37-44 show the suitability for use on aged coatings, the durability of the activated surface and the durability and chemical resistance of intercoat adhesion.
Figure 38:
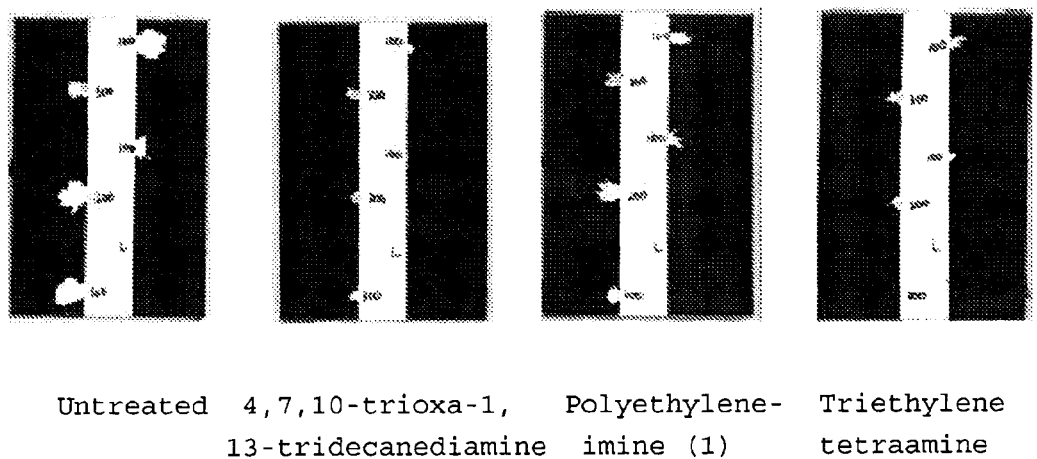

The following example illustrates that the activation procedure may be:
A. Carried out on aged coatings, that
B. Under appropriate storage conditions the activated surface is durable, that
C. Inter-coat adhesion is durable over time and that
D. Inter-coat adhesion is resistant to chemical exposure.
A. Inter-coat adhesion of aged coatings prior to over-coating
(1) White coating aged for 156 h, 49° C. prior to over-coating with Blue coating. Treatment: Amino-terminated polypropyleneglycol 50% in dichloromethane (30 min)—See FIG. 37.
(2) White topcoats cured for 16 h, 49° C. and stored for 3 months under ambient conditions prior to over-coating with blue polyurethane coating (treatment: 50% adhesion promoter in ethyl acetate, 30 min)—See FIG. 38.

B. Inter-coat adhesion of aged activated surface. (Aged white polyurethane coatings (49° C., 18 h), activated, and stored under ambient conditions for three months prior to over-coating with blue polyurethane).

Figure 39:
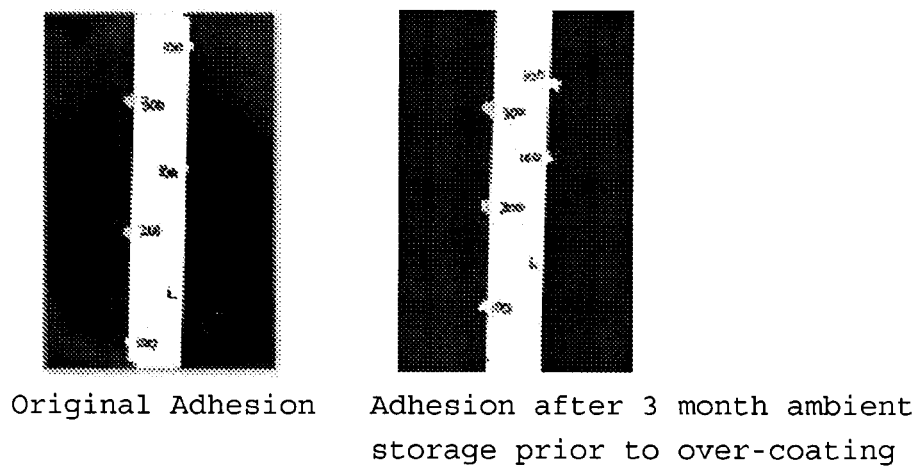

Treatment 50% 4,7,10-trioxa-1,13-tridecanediamine in ethyl acetate, 30 min—See FIG. 39.

Figure 40:
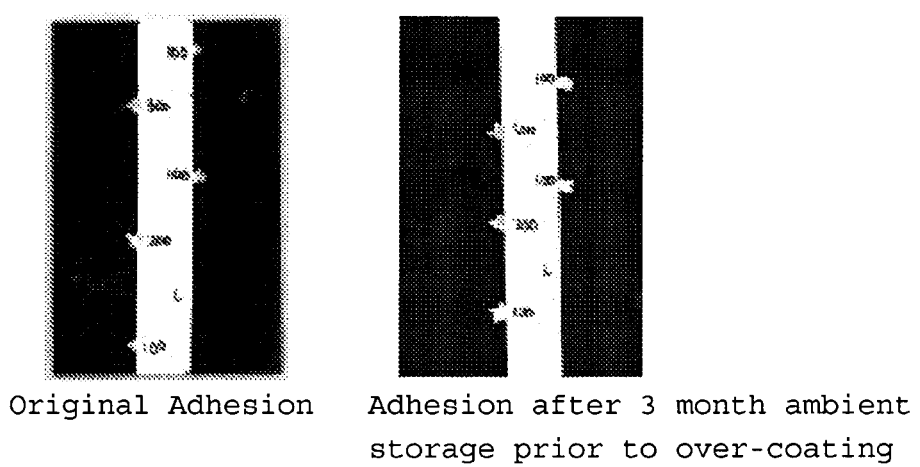

Treatment 50% Polyethylene imine (linear) in ethyl acetate, 30 min—See FIG. 40.

C. Inter-coat adhesion over time. (Activation of aged white polyurethane coatings (49° C., 18 h) prior to over-coating with blue polyurethane).

Figure 41:
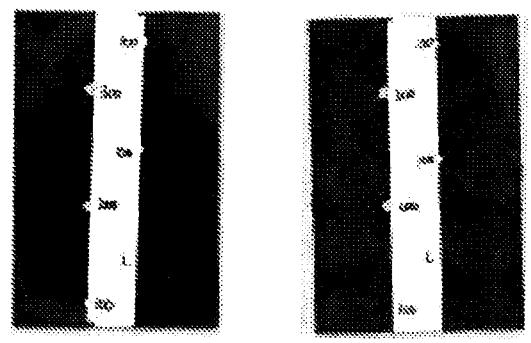

Treatment 50% 4,7,10-trioxa-1,13-tridecanediamine in ethyl acetate, 30 min—See FIG. 41.

Figure 42:
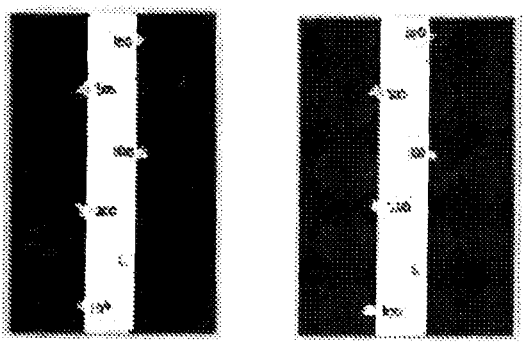

Treatment 50% Polyethylenen imine (linear) in ethyl acetate, 30 min—See FIG. 42.

D. Following exposure to Skydrol Hydraulic Fluid for 30 days Treatment 50% adhesion promoter in ethyl acetate.

Figure 43:
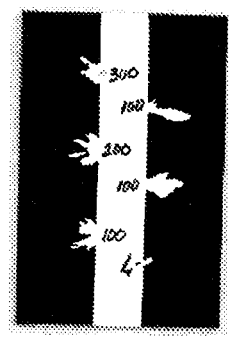
Figure 43:
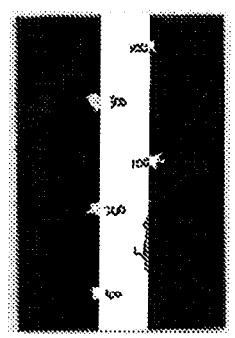
Figure 43:
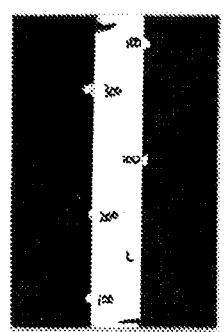

No Exposure—See FIG. 43.

Figure 44:
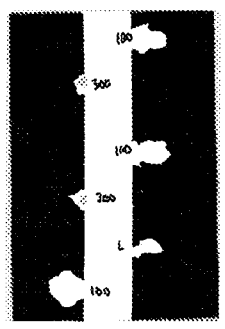
Figure 44:
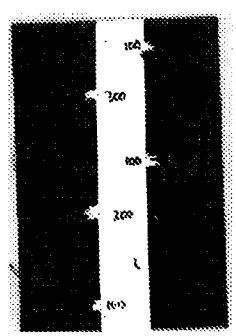
Figure 44:
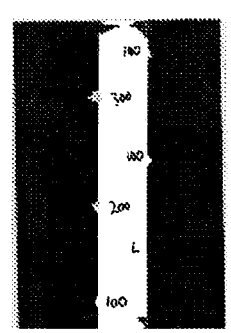

30 day exposure—See FIG. 44.

Results Indicate:

As shown in FIGS. 37-44, polyurethane coatings aged for extended periods under ambient or higher temperatures may be activated by application of the activation treatment to produce improved inter-coat adhesion as assessed by SIJA techniques. The activated surface itself is also robust under appropriate storage conditions, as is the inter-coat adhesion between paint layers over time as well as following exposure to chemicals such as those used in hydraulic fluid.

Example 13

Figure 45:
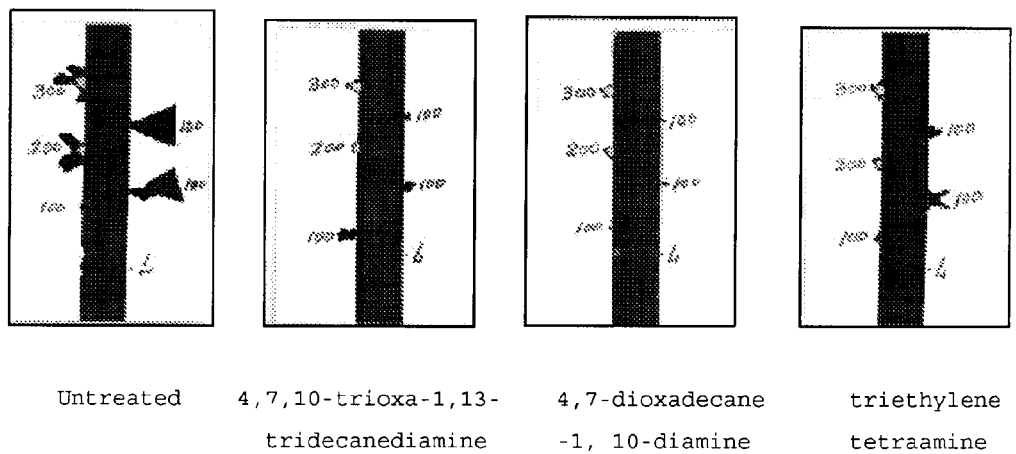
FIG. 45 shows the intercoat adhesion between an aged and activated coating and an additional coating.

The example shown in FIG. 45 illustrates the inter-coat adhesion between aged and then activated organically pigmented polyurethane coating (blue) towards an additional coating layer (white).

Treatment 50% adhesion promoter in ethyl acetate, 30 min.

Results Indicate:

As shown in FIG. 45, the adhesion promoting treatment provides improved inter-coat adhesion between aged organically pigmented coating (eg blue) and additional coating layers.

Example 14

The following example indicates that the inter-coat adhesion produced through chemical activation with suitable adhesion promoter/s and solvent/s is comparable to that produced by sanding and as such it may be used to replace the sanding process as a mechanism of improving the adhesion of coatings which are aged to fresh coating layers.

Figure 46:
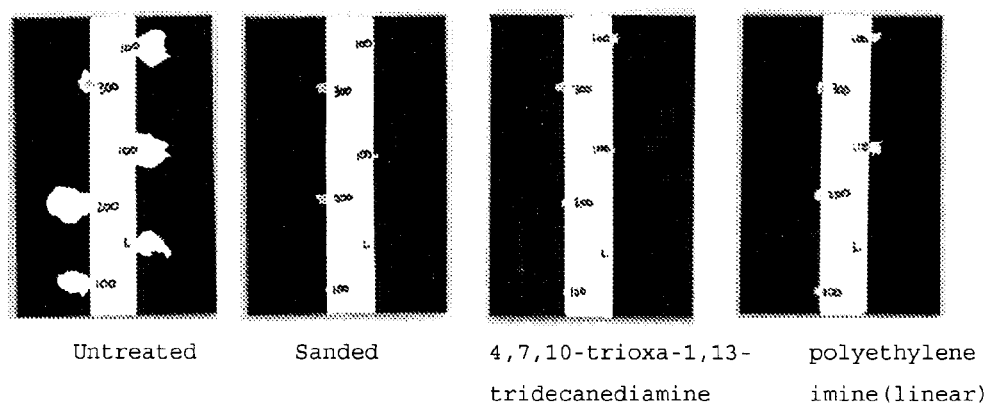

A. SIJA inter-coat adhesion of aged polyurethane coatings (49° C., 18 h) which were then over-coated with blue polyurethane top-coat (activation solution 50% adhesion promoter in ethyl acetate). See FIG. 46.

B. Whirling arm rain erosion results of inter-coat adhesion of aged polyurethane coatings (49° C., 18 h) which were then over-coated with blue polyurethane top-coat (activation solution 50% adhesion promoter in ethyl acetate). See FIG. 47.

Results Indicate:

Analysis by SIJA and whirling arm rain erosion experiments indicate that inter-coat adhesion of specimens activated with suitable adhesion promoter and solvent is comparable to the performance obtained by sanding aged polyurethane coating prior to over-coating. In terms of rain erosion analysis: 88% of the over coat is removed from untreated samples, 0.4% from sanded, 0.6% from sample chemically activated with PEI and 0% with those activated with 4,7,10-trioxa-1,13-tridecanediamine prior to over-coating. In terms of SIJA experiments assessment of the paint area removed indicated that 177 mm$^2$ of the over coat is removed from untreated samples, 13 mm$^2$ from sanded, 28 mm$^2$ from sample chemically activated with PEI and 13 mm$^2$ with those activated with 4,7,10-trioxa-1,13-tridecanediamine prior to over-coating.

Example 15

SEM analysis of inter-coat adhesion of specimens painted with white polyurethane cured/aged for 18 h at 49° C. and activated prior to over-coating with blue polyurethane:

FIG. 48A. 18 h at 49° C. prior to over-coating

Figure 48B:
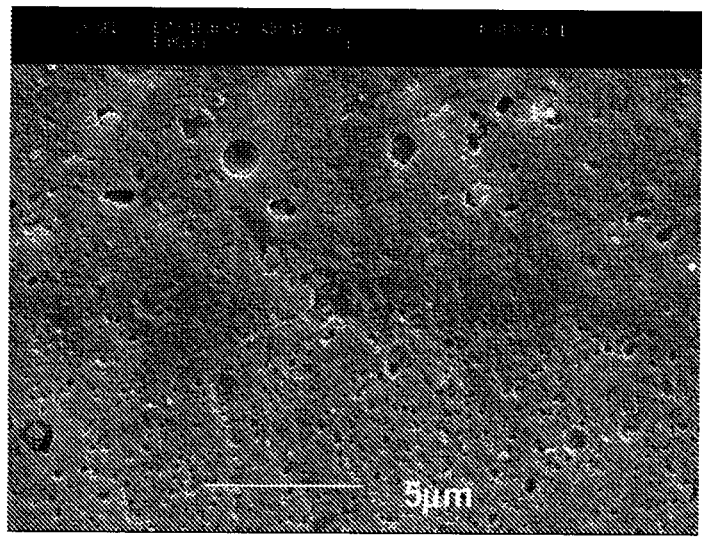
FIGS. 48 A-C are SEMs of coated specimens prepared by various methods.

FIG. 48B. 18 h at 49° C. and then sanded prior to over-coating

Figure 48C:
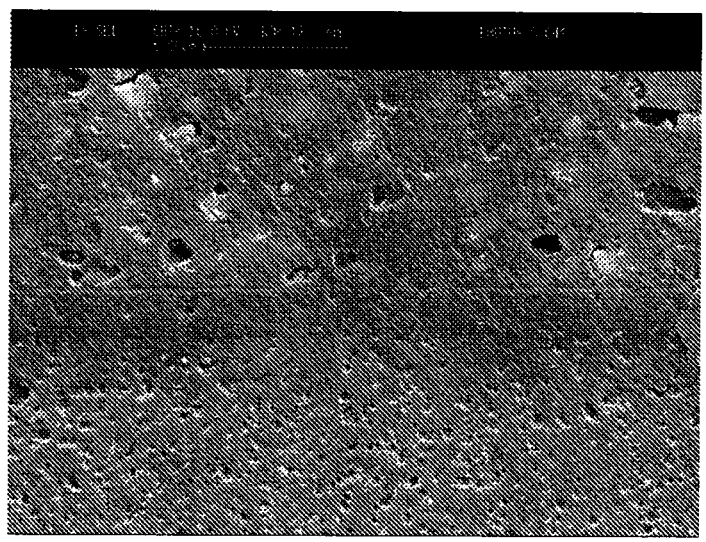

FIG. 48C. 18 h at 49° C. and then treated with amine terminated polypropylene glycol (Mn 230, 50%, 60 min) in benzyl alcohol prior to over-coating Results Indicate:

Poor inter-coat bonding in FIG. 48A. with voids, cracks and de-lamination between the coatings. Additional coat does not appear to wet the aged white existing coating layer.

Good inter-coat adhesion in FIG. 48B. when the sample has been sanded prior to re-painting.

Good inter-coat adhesion in FIG. 48C. when sample has been chemically activated prior to over-coating.

In both Examples 48B & 48 C the fresh coating appears to wet the aged coating well.

Example 16

Penetration depth of various chemical activation treatments into the paint film as determined by raman spectroscopy through the ratio of benzyl alcohol (~1000 cm$^{-1}$) and polyurethane CH$_2$ (1450 cm$^{-1}$) peaks.

Figure 49A:
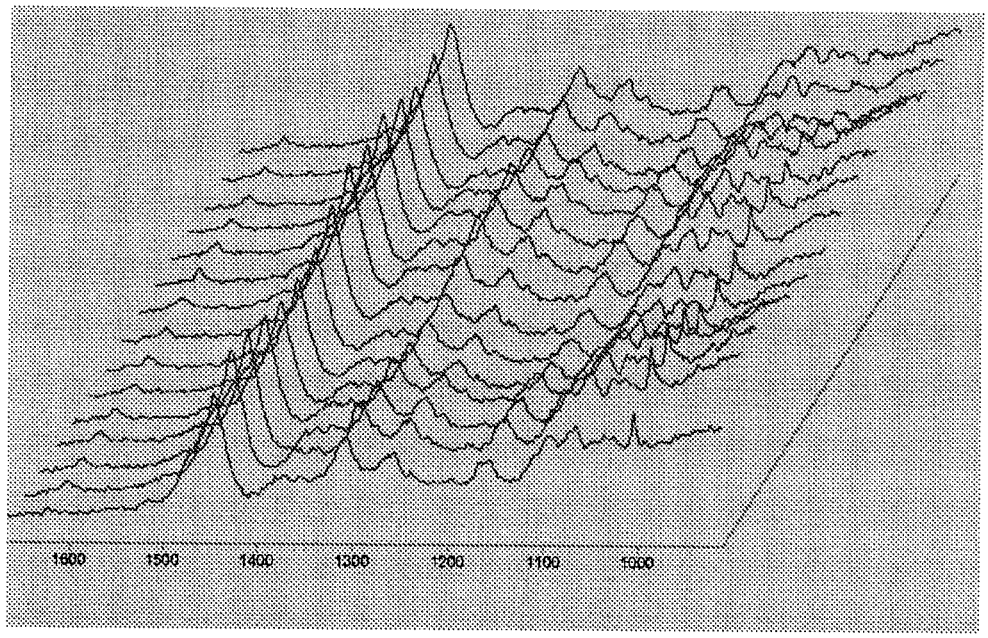
FIGS. 49 A-D attached are graphs showing depth of various chemical activation treatments into a paint film.
Figure 49B:
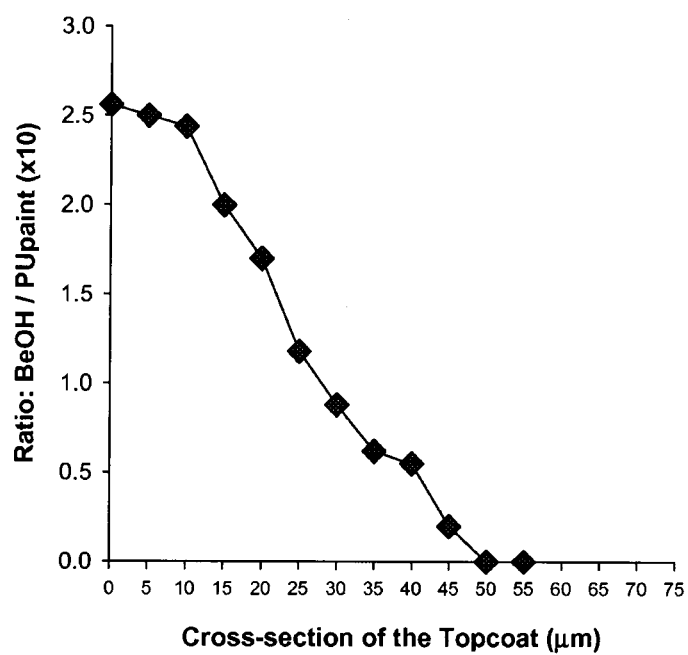

Benzyl alcohol only (30 min exposure)—See FIG. 49A-B.

Figure 49C:
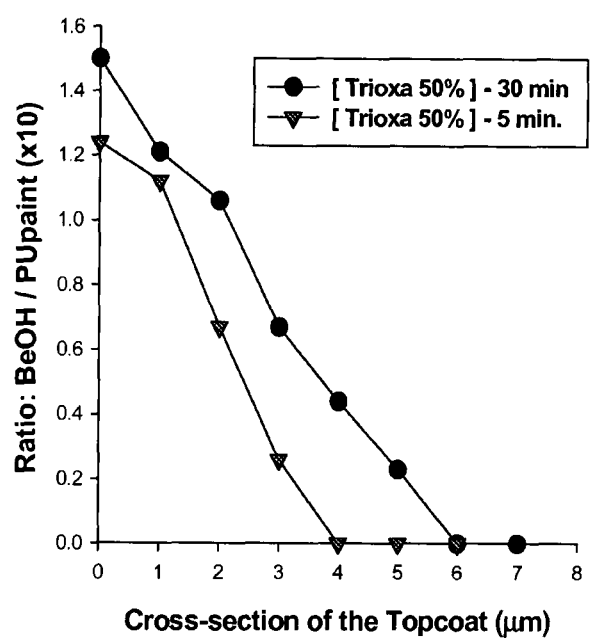

4,7,10-trioxa-1,13-tridecanediamine in benzyl alcohol (50%)—See FIG. 49C.

Figure 49D:
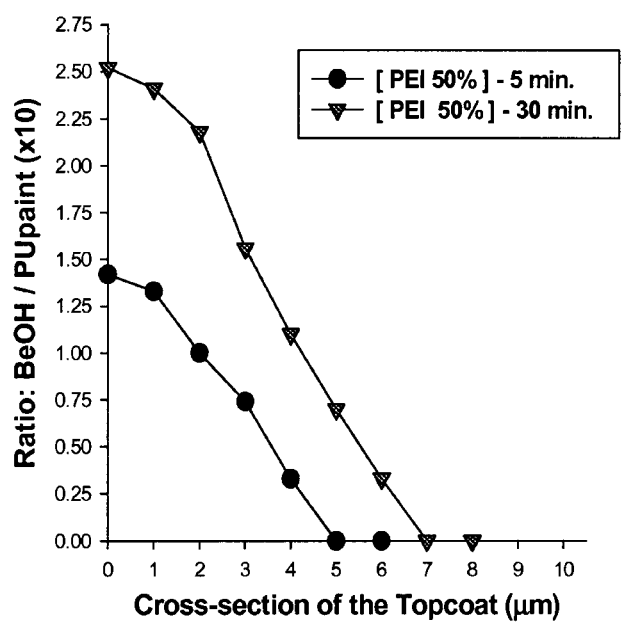

Polyethylene imine (linear, Mw=425) in benzyl alcohol (50%)—See FIG. 49D.

Results Indicate:

As shown in FIGS. 49 A-D, unlike benzyl alcohol when used on the painted surface alone, solutions of 4,7,10-trioxa-1,13-tridecanediamine or polyethylene imine in benzyl alcohol even after 30 min exposure time penetrate the paint film less than 7 micron (re: 55 micron for benzyl alcohol alone). This indicates that the activation treatment is limited to the coating surface through the appropriate choice of solvent/s adhesion promoter/s and adhesion promoter/s concentration.

Example 17

XPS analysis of a polyurethane coating before and following surface treatment in Dichlormethane.

| Treatment | % Carbon | % Oxygen | % Nitrogen |
|---|---|---|---|
| Untreated (average of 3 batches) | 78.2 | 19.8 | 2.0 |
| 60 min Treatment | | | |
| Amine-terminated polypropylene glycol Mn = 230, 10% | 70.5 | 26.1 | 3.4 |
| Amine-terminated polypropylene glycol Mn = 230, 50% | 66.3 | 26.7 | 3.7 |

-continued

| Treatment | % Carbon | % Oxygen | % Nitrogen |
|---|---|---|---|
| | 180 min Treatment | | |
| Amine-terminated polypropylene glycol Mn = 230, 10% | 69.2 | 28.1 | 2.7 |
| Amine-terminated polypropylene glycol Mn = 230, 50% | 68.5 | 28.2 | 3.3 |

XPS analysis of a polyurethane coating before and following surface treatment in benzyl alcohol.

| Treatment | % Oxygen | % Nitrogen |
|---|---|---|
| Untreated | 27.9 | 5.5 |
| | 60 min treatment | |
| Polyethylene imine (Linear) Mw 425 | 25.7 | 8.9 |
| Polyethylene imine (branched) Mw 800 | 25.5 | 8.5 |

Results Indicate:

Changes in elemental composition occur on treatment of an aged polyurethane surface (49° C., 18 h) following treatment with appropriate activation solution. The changes in elemental composition are consistent with adhesion promoter being embedded or bonded to the coating.

Example 18

Green scribe adhesion of Desothane HS 70846 white (30±5 µm, C-thinner) cured 40 h at 120° F. (5% RH), 48 h at 120° F. (50% RH) and 24 h at 160° F., activated and over-coated with Desothane HS S601X blue (65±10 µm, 16 h ambient ~30-40% RH). 16 hrs between over-coat and the scribe adhesion.

Figure 50:
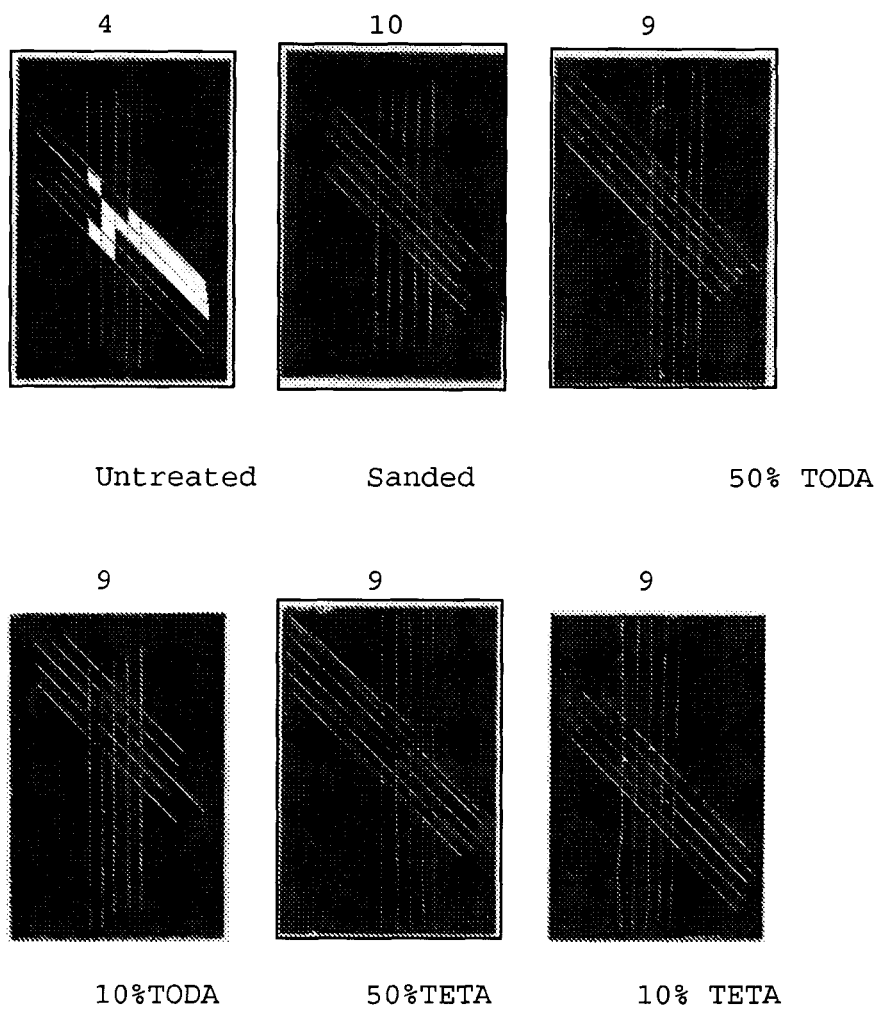
FIG. 50 shows green scribe adhesion of a coating prepared by a particular method.

Activation Conditions: Treatment ethyl acetate 30 min/ iPOH wipe, horizontal application position Results Indicate:

As shown in FIG. 50, adhesion between the activated coating surface and the fresh coating builds up quickly which is important in terms of practical use of the activation method.

Example 19

SIJA inter-coat adhesion of Desothane HS 70846 white (30±5 µm, C2-thinner) cured 40 h at 120° F., 5% RH, 48 h at 120° F., 50% RH and 24 h at 160° F., activated in NMP (30 min) SOLO and over-coated with Desothane HS S601X blue (93±10 µm).

Appearance rating (1 to 3): 1 normal paint quality, 2 minor defects 3 obvious defects.

Figure 51:
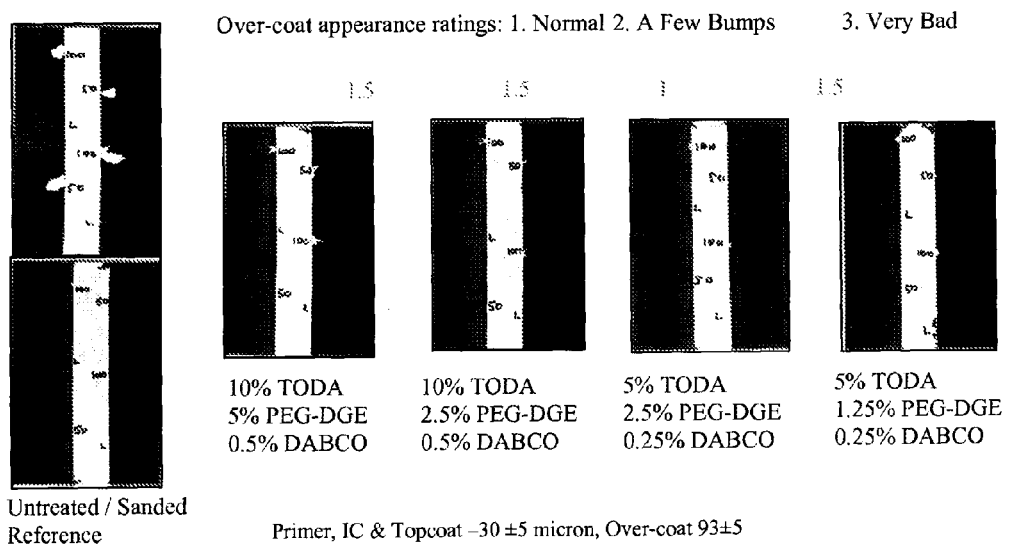
FIG. 51 shows the intercoat adhesion of a coating prepared by a particular method.

The Results Indicate:

As shown in FIG. 51, results indicate improve inter-coat adhesion is provided through use of two or more adhesion promoters with varied chemical functionality.

Example 20

SIJA and green scribe inter-coat adhesion of Desothane HS 70846 white (30±5 µm, C2-thinner) cured 40 h at 120° F., 5% RH, 48 h at 120° F., 50% RH and 24 h at 160° F., activated with trimethoxy silyl(propyl)diethylenetriamine in IPA—EEA solvent SOLO and over-coated with Desothane HS S601X blue (93±10 µm).

Figure 52:
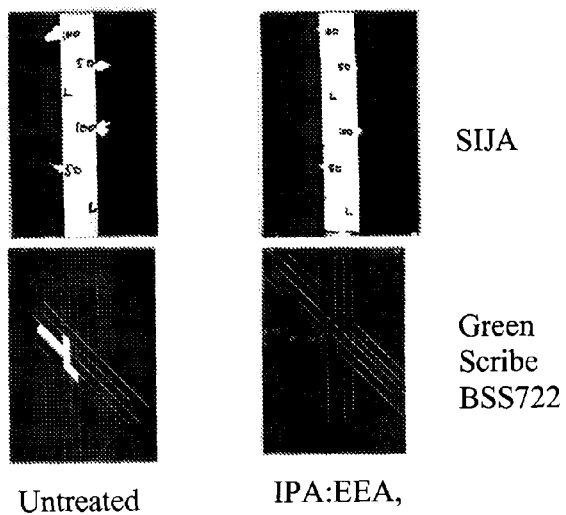
FIG. 52 shows SJIA and green scribe intercoat adhesion of a coating prepared by particular method.

The Results Indicate:

As shown in FIG. 52, results indicate that amino functional silane may be used to improve inter-coat adhesion when applied. Results also indicate that a combination of alcohol and acetate ether solvent may be employed.

Example 21

SIJA and green scribe inter-coat adhesion of Desothane HS 70846 white (30±5 µm, C2-thinner) cured 40 h at 120° F., 5% RH, 48 h at 120° F., 50% RH and 24 h at 160° F., activated with amine—epoxy mix in various solvent combinations SOLO and over-coated with Desothane HS S601X blue (93±10 µm).

Figure 53:
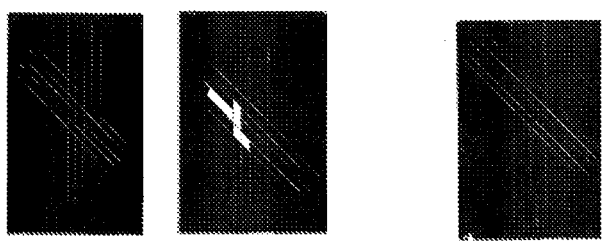
FIG. 53 shows SJIA and green scribe intercoat adhesion of a coating prepared by particular method.
Figure 53:
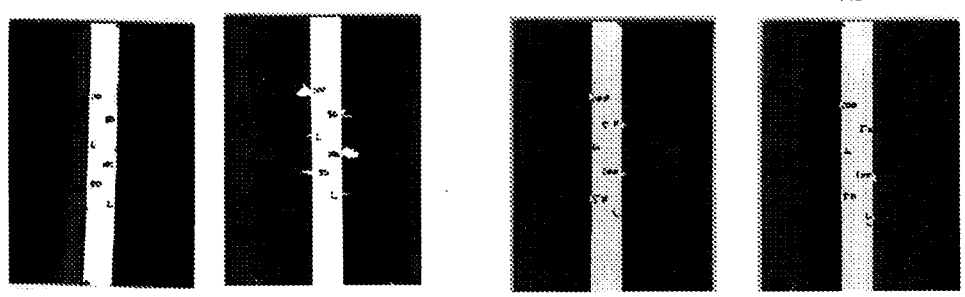

The Results Indicate:

As shown in FIG. 53, the results indicate that improved inter-coat adhesion results from the activation treatment incorporating an amine and epoxy derivatized adhesion promoters.

Example 22

SIJA and green scribe inter-coat adhesion of Desothane HS 70846 white (30±5 µm, C2-thinner) cured 40 h at 120° F., 5% RH, 48 h at 120° F., 50% RH and 24 h at 160° F., activated with amine—epoxy mix in the solvent combination SOLO. Prior to activation vinyl mask was placed over the coating surface, the specimen activated and then overcoated with Desothane HS S601X blue (93±10 µm).

Figure 54:
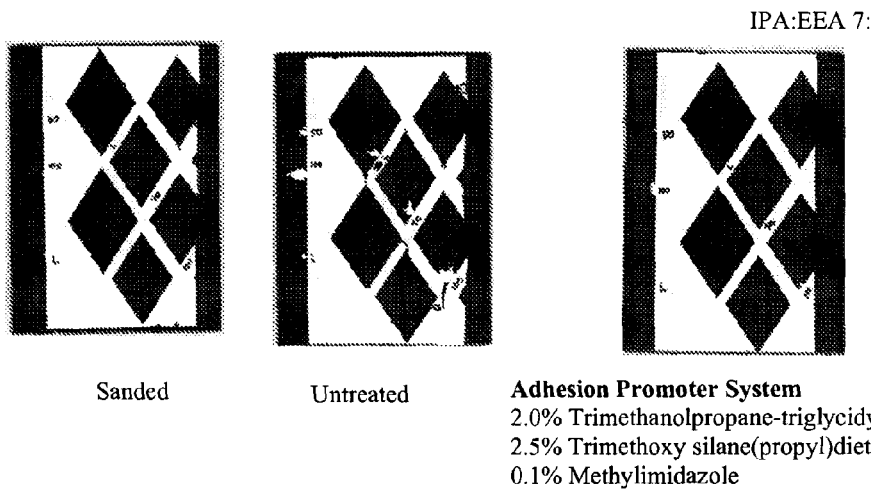
FIG. 54 shows SJIA and green scribe intercoat adhesion of a coating prepared by particular method.

Results Indicate:

As shown in FIG. 54, the results indicate that application over the vinyl mask was possible to provide intricate designs/shapes and improved inter-coat adhesion.

Example 23

Impact of activation solution (2 hour immersion) on common material used on aircraft (polysulfide sealant).

Figure 55:
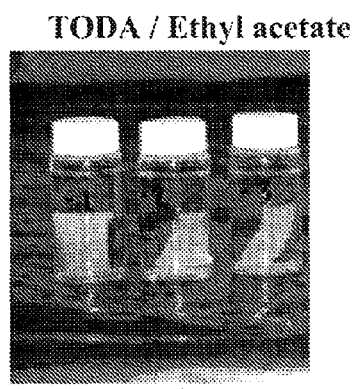
FIGS. 55-58 show the impact of an activation solution on common material used on aircraft.

Results Indicate:

As shown in FIG. 55, at the concentrations specified the activation solution does not appear to impact the polysulfide sealant after 2 h.

Example 24

Impact of activation solution on common material used on aircraft (epoxy—graphite fibre composite) relative to various solvents and Cee-Bee paint stripper.

Figure 56:
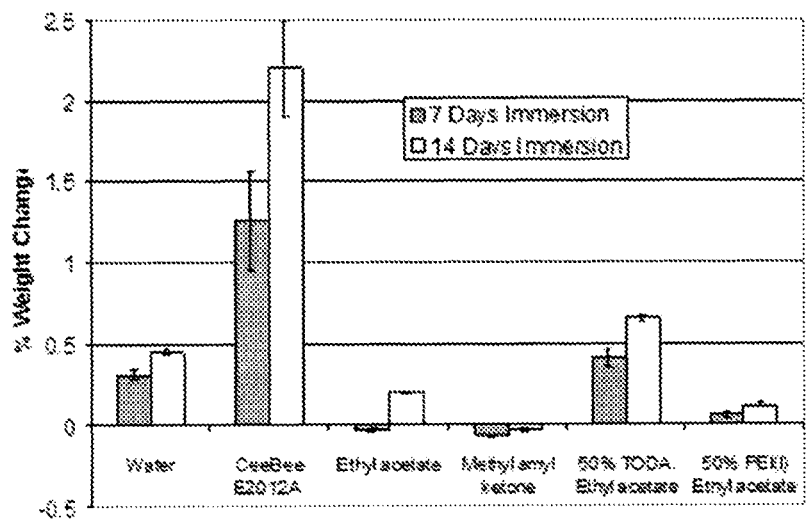

Results Indicate:

As shown in FIG. 56, that the treatment solution does not impact on the composite substrate in terms of weight gain or loss.

Example 25

Impact of activation solution (Trimethanol propanetriglycidyl ether, trimethoxysilyl(propyl) diethylene triamine (1:1.3 wt % in iPA:EEA, 7:3, 40 hour immersion) on common material used on aircraft (polysulfide sealant) relative to water and methylpropylketone.

Figure 57:
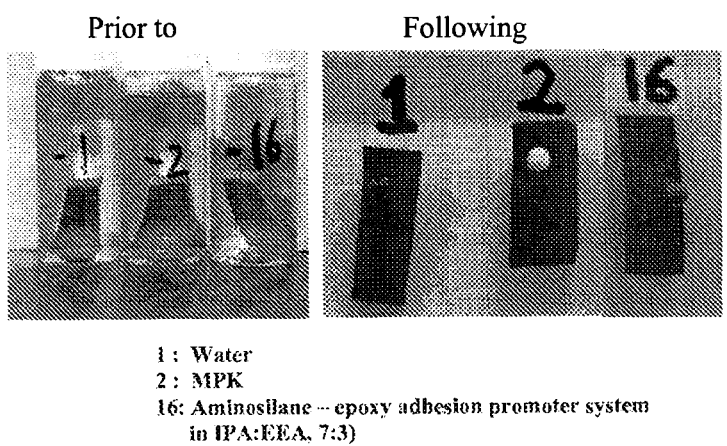

Results Indicate:

As shown in FIG. 57, that the sealant material is not degraded on immersion into the activation treatment solution.

Example 26

Figure 58:
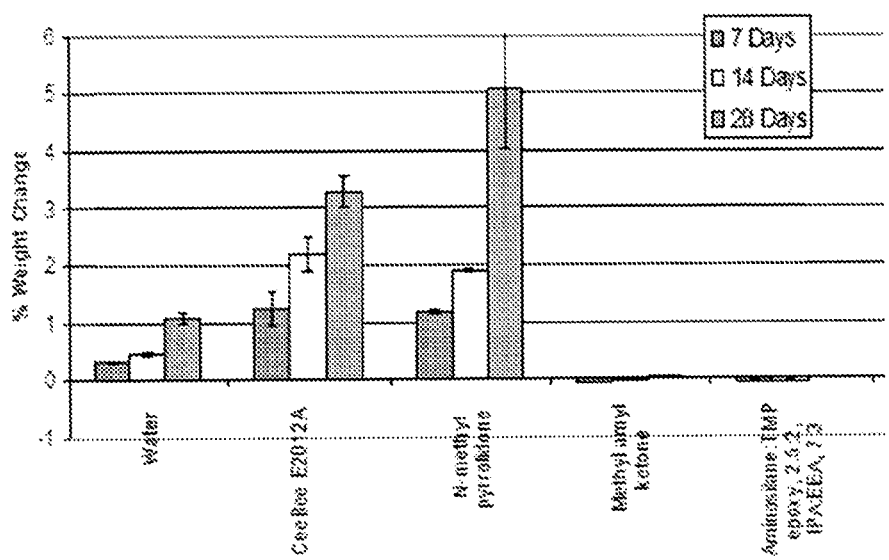

Impact of activation solution (Trimethanol propanetriglycidyl ether, trimethoxysilyl(propyl) diethylene triamine (1:1.3 wt % in iPA:EEA, 7:3, 40 hour immersion) on common material used on aircraft (epoxy-graphite fibre composite) relative to various solvents and Cee-Bee paint stripper.
Results Indicate:
As shown in FIG. 58, that the treatment solution does not impact on the composite substrate in terms of weight gain or loss.

Example 27

Figure 59:
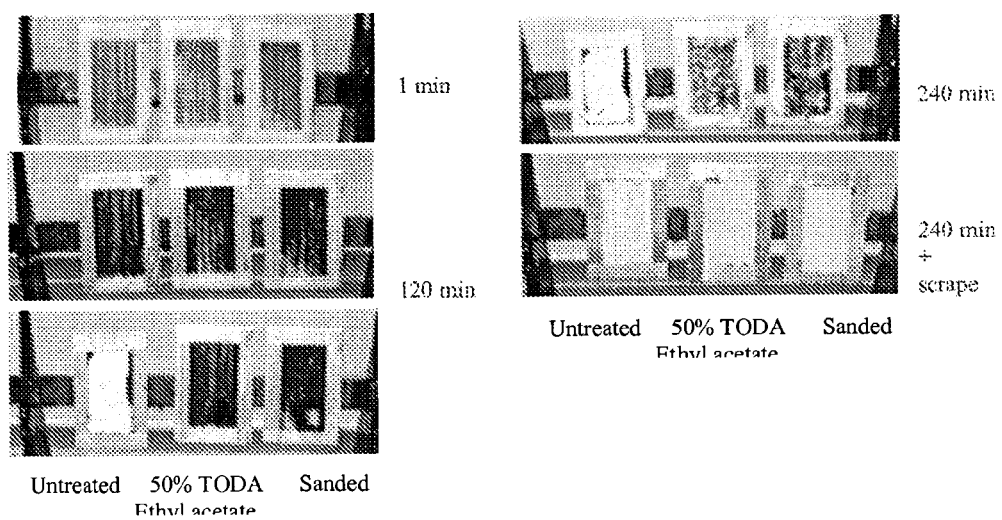
FIG. 59 shows paint stripping of a coated-treated-overcoated material.

Example 26 illustrates paint stripping of Desothane HS 70846 white (30±5 μm, C2-thinner) cured 40 h at 120° F., 5% RH, 48 h at 120° F., 50% RH and 24 h at 160° F., chemically activated and overcoated with Desothane HS S601X blue (93±10 μm) relative to reference samples.
Results Indicate:
As shown in FIG. 59, chemically activated samples strip similarly to samples reactivated by sanding.

Example 28

Figure 60:
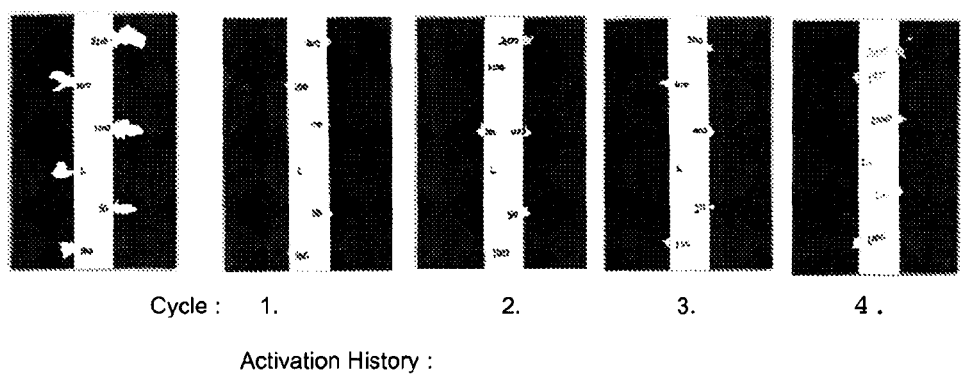
FIG. 60 shows intercoat adhesion of an aged activated surface.

Example 28 Illustrates SIJA Inter-coat adhesion of aged activated surface. (Aged white polyurethane coatings (49° C., 18 h), activated, 50% TODA/Ethylacetate, 30 min water wash post treatment (SOHO), and passed through 0-3 heat cycles (49° C., 4 h) prior to overcoating with Blue.
Results Indicate:
As shown in FIG. 60, reactivated surface remains active even after the thermal cycles.

In summary, the present writing relates to a method of activating an organic coating, a coated substrate having an activated coating and an activation treatment for an organic coating. In particular, the activation method improves the adhesion of the organic coating to further coating layers and/ or to other entities.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

We claim:
1. A method of activating an organic coating present on a substrate to increase adhesion of the organic coating to a further coating and/or to other entities selected from adhesives, sealants, fillers and pressure sensitive decals or logos, the method comprising:
applying an activation treatment to the organic coating present on the substrate wherein the activation treatment increases adhesion of a further coating and/or other entities selected from adhesives, sealants, fillers and pressure sensitive decals or logos to the organic coating on the substrate, wherein,
the organic coating is a cross-linked organic coating which is a polyurethane, epoxy, polyester and/or acrylic cross-linked coating, and wherein,
the activation treatment consists of:
an organic solvent selected from ester based solvents, ketones, alcohols, ethers, amides, aromatics and halogenated solvents and combinations thereof;
an adhesion promoter selected from linear and branched polyethylene imines (PEI), amine and/or hydroxyl terminated polyether glycols, dendrimers, ethylene diamine, diethylene tetraamine, triethylene tetraamine (TETA), tetraethylene pentamine, pentaethylene hexamine, piperazine, aminoethylpiperazine, 1,4-bis(3-aminopropyl)piperazine, N,N'-bis(3-aminopropyl)ethylenediamine, 4,9-dioxa-1,12-dodecanediamine, 2,2'-(ethylenedioxy)bis(ethylamine), 4,7,10-trioxamidecane-1,13-diamine (TODA), 4,7-dioxadecane-1,10-diamine (DODA), polyetheramine T 403, N,N-bis (3-aminopropyl)-ethylene diamine, 3-2(2-aminoethyl)aminopropyl amine, dipropyltriamine, 4,4' diamino-dicyclohexylamine, glycidylethers, aziridines and combinations thereof and optionally an additive,
wherein contact of the cross-linked organic coating with the solvent or the solvent and adhesion promoter combination results in swelling of the cross-linked organic coating.

2. A method according to claim 1, in which the adhesion promoter is a compound selected from linear and branched polyethylene imines (PEI), amine and/or hydroxyl terminated polyether glycols and dedrimers having at least one functional group.

3. A method according to claim 2, in which the adhesion promoter is a compound having two or more functional groups which are of the same or different functionality.

4. A method according to claim 2, in which the functional group is nucleophilic.

5. A method according to claim 4, in which the functional group is selected from amine, alcohol, carboxylic acid, amide, ester, thiol, ether, and anhydride groups.

6. A method according to claim 1, in which the amine and/or hydroxyl terminated polyether glycols are selected from polyethylene glycol, polypropylene glycol and polyethylene oxide.

7. A method according to claim 1, in which the dendrimers are selected from polypropylene imine octamine dendrimer and polypropylene imine tetraamine dendrimer.

8. A method according to claim 1, in which the adhesion promoter is selected from ethylene diamine, diethylene tetraamine, triethylene tetraamine (TETA), tetraethylene pentamine, pentaethylene hexamine, piperazine, aminoethylpiperazine, 1,4-bis(3-aminopropyl)piperazine, N,N'-bis(3-aminopropyl)ethylenediamine, 4,9-dioxa-1,12-dodecanediamine, 2,2'-(ethylenedioxy)bis(ethylamine), 4,7, 10-trioxamidecane-1,13-diamine (TODA), 4,7-dioxadecane-1,10-diamine (DODA), polyetheramine T 403, N,N-bis(3-aminopropyl)-ethylene diamine, 3-2(2-aminoethyl) aminopropyl amine, dipropyltriamine, 4,4' diamino-dicyclohexylamine, glycidylethers, aziridines and combinations thereof.

9. A method according to claim 8, in which the adhesion promoter is selected from TODA and DODA, and combinations thereof.

10. A method according to claim 1, in which the glycidylethers are selected from trimethanolpropane triglycidylether and polyethylene glycol diglycidyl ethers.

11. A method according to claim 1, in which the aziridine is trimethylolpropanetris (3-aziridino propionate).

12. A method according to claim 1, in which the adhesion promoter has a molecular weight less than about 100,000.

13. A method according to claim 12, in which the adhesion promoter has a molecular weight less than about 10,000.

14. A method according to claim 1, in which two or more adhesion promoters are present.

15. A method according to claim 14, in which high and low molecular weight adhesion promoters are present.

16. A method according to claim 15, in which the high and low molecular weight adhesion promoters are high and low molecular weight polyether glycols.

17. A method according to claim 16, in which the high and low molecular weight polyether glycols are 4,9-dioxa-1,12-dodecane diamine and polypropylene glycol, respectively.

18. A method according to claim 14, in which the adhesion promoter is a combination of aziridines and trimethylolpropanetris (3-aziridino propionate); aziridine and acids; or aziridine and glycols.

19. A method according to claim 1, in which the adhesion promoter is present in an amount more than about 0.01% based on the total weight of the combination of solvent and adhesion promoter.

20. A method according to claim 1, in which the adhesion promoter is present in an amount of about 1% to about 50% based on the total weight of the combination of solvent and adhesion promoter.

21. A method according to claim 1, in which the solvent is selected from ethyl acetate, isopropyl acetate, tertiary butyl acetate, glycolether acetates based on ethyleneglycol and propylene glycol repeat units, methyl amyl ketone, methyl isoamyl ketone, benzyl alcohol, isopropylalcohol, glycoldiethers, N-methylpyrrolidinone, dichloromethane and dichloroethylene.

22. A method according to claim 1, in which the solvent is a combination of N-methylpyrrolidinone and ethyl acetate; dichloromethane and benzyl alcohol; ethyl acetate and benzyl alcohol; ethyl acetate and diglycol ether dimethyl ether; or isopropylalcohol and ethoxyethylacetate.

23. A method according to claim 1, in which the solvent is present in an amount less than about 99.9% based on the total weight of the combination of solvent and adhesion promoter.

24. A method according to claim 23, in which the solvent is present in an amount of about 50 to about 99.9% based on the total weight of the combination of solvent and adhesion promoter.

25. A method according to claim 1, in which the additive is selected from rheology modifiers, film formers, wetting agents, surfactants, dispersants, substrate cling agents, antifoaming agents, anti-corrosion reagents, stabilizers, leveling agents, pigments and dyes.

26. A method according to claim 1, in which the additive is present in an amount of less than about 10% based on the total weight of the combination of solvent, adhesion promoter and additive.

27. A method according to claim 1, in which the solvent and adhesion promoter are applied either simultaneously, sequentially or separately.

28. A method according to claim 1, in which the solvent and adhesion promoter are applied simultaneously in the form of an activation treatment.

29. A method according to claim 1, in which the solvent and adhesion promoter are applied via a spray, brush, dip, knife, blade, hose, roller, wipe, curtain, flood, flow, mist, pipette or combinations thereof.

30. A method according to claim 1, in which excess solvent and/or adhesion promoter is removed by solvent or water rinsing; dry, water or solvent wiping; air or gas knife; vacuum application; squeegee; and/or natural or forced convection evaporation.

31. A method according to claim 1, in which the solvent, adhesion promoter and additive are applied either simultaneously, sequentially or separately.

32. A method according to claim 1, in which the solvent, adhesion promoter and additive are applied simultaneously in the form of an activation treatment.

33. The method of claim 1, wherein the cross-linked organic coating comprises multiple layers.

34. A coated substrate comprising:
a substrate;
a cross-linked organic coating, which is one or more of a polyurethane, epoxy, polyester and/or acrylic coating adhered to the substrate and adhered to one or more of a further organic coating, adhesive, sealant, pressure sensitive decal and logo,
wherein a surface of the cross-linked organic coating has been activated by application of an activation treatment prior to adhesion of the one or more of a further organic coating, adhesive, sealant, pressure sensitive decal and logo, the activation treatment consisting of:
an organic solvent selected from ester based solvents, ketones, alcohols, ethers, amides, aromatics and halogenated solvents, and combinations thereof;
an adhesion promoter selected from linear and branched polyethylene imines (PEI), amine and/or hydroxyl terminated polyether glycols, dendrimers, ethylene diamine, diethylene tetraamine, triethylene tetraamine (TETA), tetraethylene pentamine, pentaethylene hexamine, piperazine, aminoethylpiperazine, 1,4-bis(3-aminopropyl)piperazine, N,N'-bis(3-aminopropyl)ethylenediamine, 4,9-dioxa-1,12-dodecanediamine, 2,2'-(ethylenedioxy)bis(ethylamine), 4,7,10-trioxamidecane-1,13-diamine (TODA), 4,7-dioxadecane-1,10-diamine (DODA), polyetheramine T 403, N,N-bis (3-aminopropyl)-ethylene diamine, 3-2(2-aminoethyl)aminopropyl amine, dipropyltriamine, 4,4' diamino-dicyclohexylamine, glycidylethers, aziridines and combinations thereof; and
optionally an additive
wherein contact of the cross-linked organic coating with the solvent or the solvent and adhesion promoter combination results in swelling of the cross-linked organic coating.

35. A coated substrate according to claim 34, in which the substrate is a metal, composite or a material containing wood or fabric.

* * * * *